US012761975B2

(12) United States Patent
Doriott et al.

(10) Patent No.: US 12,761,975 B2
(45) Date of Patent: Oct. 13, 2026

(54) TASK ASSIGNMENTS TO PRIMARY AND SECONDARY RESOURCES

(71) Applicant: Better Holdco, Inc., New York, NY (US)

(72) Inventors: Christopher Doriott, Henderson, NV (US); Hasan Toor, Levittown, PA (US); Andrew Lee, Edgewater, NJ (US)

(73) Assignee: Better Holdco, Inc., New York, NY (US)

( * ) Notice: Subject to any disclaimer, the term of this patent is extended or adjusted under 35 U.S.C. 154(b) by 378 days.

(21) Appl. No.: 17/503,577

(22) Filed: Oct. 18, 2021

(65) Prior Publication Data

US 2023/0122904 A1 Apr. 20, 2023

(51) Int. Cl.
*G06F 9/50* (2006.01)
*G06F 9/48* (2006.01)
*G06F 11/34* (2006.01)

(52) U.S. Cl.
CPC ............ *G06F 9/5077* (2013.01); *G06F 9/485* (2013.01); *G06F 9/5044* (2013.01); *G06F 9/5055* (2013.01); *G06F 11/3409* (2013.01); *G06F 2209/501* (2013.01)

(58) Field of Classification Search
CPC ...... G06F 9/5077; G06F 9/485; G06F 9/5044; G06F 9/5055; G06F 11/3409; G06F 2209/501
See application file for complete search history.

(56) References Cited

U.S. PATENT DOCUMENTS 7,668,703 B1 * 2/2010 Rolia ..................... G06Q 10/04 703/2
10,997,538 B1 * 5/2021 Chandrachood ............................ G06Q 10/06312
11,714,682 B1 * 8/2023 Shahane ............... G06F 9/5022 718/1
2004/0194114 A1 * 9/2004 Spiegel ............... G06F 11/3495 719/318
2005/0198281 A1 * 9/2005 Wang .................... H04L 41/069 709/224
2008/0271039 A1 * 10/2008 Rolia ..................... G06Q 10/06 718/105
2013/0111468 A1 * 5/2013 Davis .................... G06F 9/5077 718/1

(Continued)

*Primary Examiner* — Benjamin C Wu

(57) ABSTRACT

Aspects of the present disclosure relate to a dynamic resource management system. In various examples, a dynamic resource management system enables resource-consuming tasks to be assigned to resources at least according to resource profiles and resource groupings. Resources may include primary resources and secondary resources and may be grouped into resource groups such that each resource group have a selection of primary resources and secondary resources. In some instances, resource groups may be updated to have updated selections of primary resources and secondary resources. To assign tasks to resources, the dynamic resource management system may first identify multiple resource-consuming tasks associated with a resource-consuming event then assign each resource-consuming task to a resource. The task assignment may be performed based on resource information such as availability, performance, and/or experience.

19 Claims, 16 Drawing Sheets

(56) References Cited

U.S. PATENT DOCUMENTS

| | | | | |
|---|---|---|---|---|
| 2014/0122143 | A1* | 5/2014 | Fletcher | G06Q 10/0631<br>705/7.14 |
| 2014/0165067 | A1* | 6/2014 | Fiacco | G06F 9/4843<br>718/102 |
| 2014/0331235 | A1* | 11/2014 | Lee | G06F 9/5027<br>718/104 |
| 2016/0306673 | A1* | 10/2016 | You | G06F 9/5044 |
| 2016/0359683 | A1* | 12/2016 | Bartfai-Walcott | H04L 41/40 |
| 2017/0295107 | A1* | 10/2017 | Salapura | H04L 47/83 |
| 2018/0007127 | A1* | 1/2018 | Salapura | H04L 47/783 |
| 2018/0196697 | A1* | 7/2018 | Standefer | G06Q 10/103 |
| 2020/0174949 | A1* | 6/2020 | Ramasamy | G06F 12/1408 |
| 2021/0191756 | A1* | 6/2021 | Chen | G06F 9/5077 |
| 2022/0156776 | A1* | 5/2022 | Long | G06Q 30/0215 |
| 2024/0241759 | A1* | 7/2024 | Gamage | G06F 9/5027 |

* cited by examiner

TASK ASSIGNMENTS TO PRIMARY AND SECONDARY RESOURCES

BACKGROUND

Resource and workflow management may typically be difficult, for example in that out-of-date or inconsistent resource information such as resource-associations may lead to processing delays, resource frustration, and unintended behaviors. Further, effectively assigning tasks to the appropriate resources for prompt and efficient task completion may be challenging. For example, it may be challenging to factor in the capabilities and availability of each resource when assigning tasks. Such challenges may be enlarged when the resources are grouped into several groups.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure relate to a dynamic resource management system. In various examples, a dynamic resource management system enables resource-consuming tasks to be assigned to resources at least according to resource profiles and resource groupings. Resources may include primary resources and secondary resources. Further, resources may be grouped into resource groups, such that each resource group has a selection of primary resources and secondary resources. In some instances, resource groups may be updated to have updated selections of primary resources and secondary resources. To assign tasks to resources, the dynamic resource management system may identify multiple resource-consuming tasks associated with a resource-consuming event and assign each resource-consuming task to a resource. The task assignment may be performed based on resource information, such as availability, performance, and/or experience.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive examples are described with reference to the following Figures.

DETAILED DESCRIPTION

Figure 1:
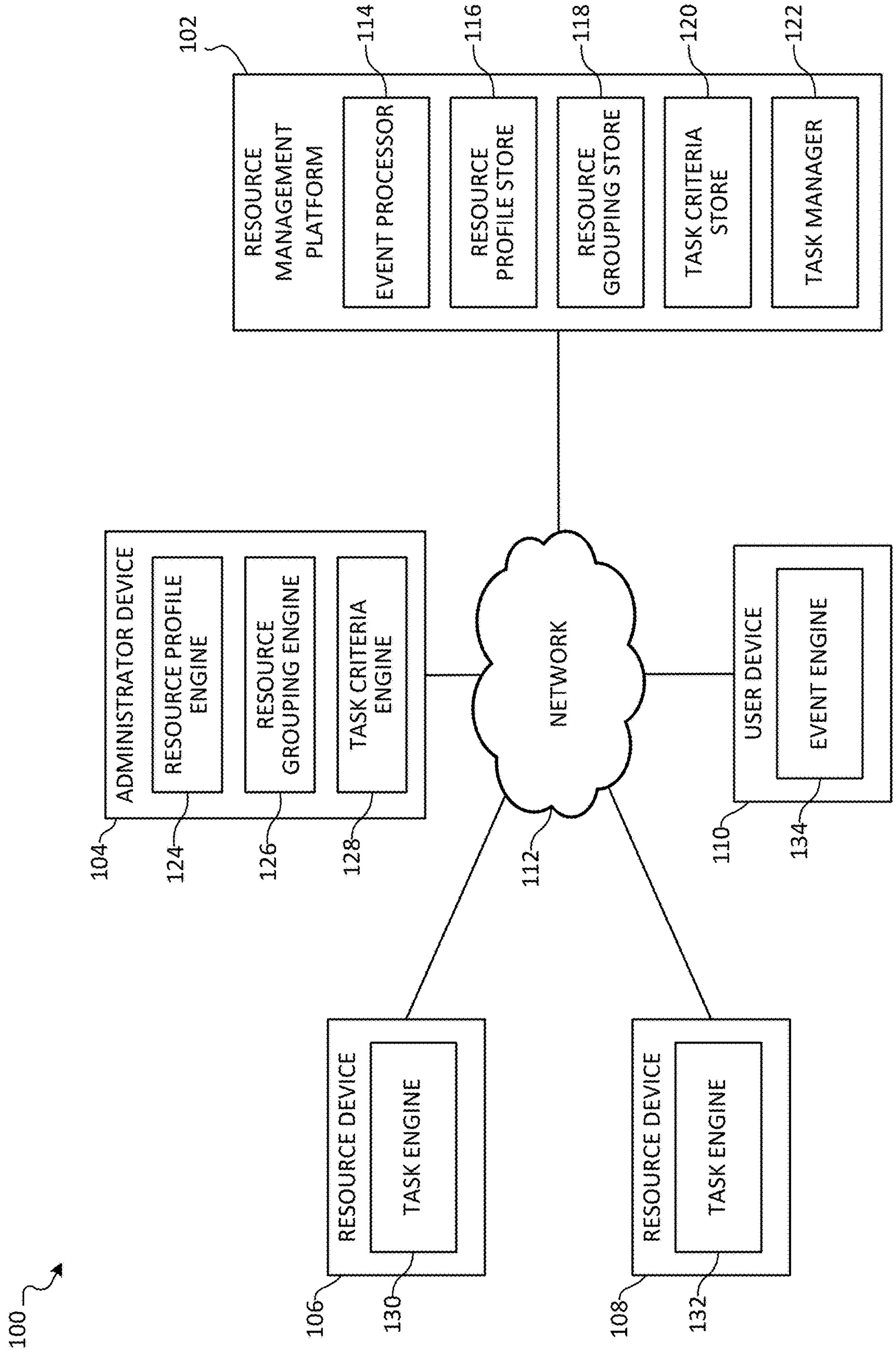
FIG. 1 illustrates an overview of an example system in accordance with the dynamic resource management techniques described herein.

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

Resource and workflow management may typically be a manual process such that out-of-date resource information such as resource-associations may lead to processing delays, resource frustration, and unintended behaviors. According to various aspects of the present disclosure, dynamic resource groupings may be associated with a workflow, such that resources in the group may be updated separate from the association between the group and the workflow. As a result of this abstraction, resource groupings may be changed as needed (e.g., as resources join, leave, and/or are moved between groups), and workflows and other systems relying on such resource groupings may operate based on, but separate from, resource membership of associated resource groupings. Such dynamic resource groupings, when coupled to a task assignment workflow, creates a dynamic resource management system capable of allocating resources to complete tasks timely and efficiently.

In various embodiments, a dynamic resource management system may include a resource management platform in communication with one or more administrator devices, one or more resource devices, and one or more user devices. The one or more resource devices may facilitate task assignment and/or monitor task completion by associated resources. For example, each resource device may transmit a resource status (e.g., resource availability and/or task progress) of an associated resource to the resource management platform to facilitate task assignment. The one or more administrator devices may modify resource profiles and/or resource groupings and provide the updated profiles and/or groupings to the resource management platform. For example, resource groupings may be modified when an existing resource transfers from one resource group to another, when a new resource is added to a resource group, or when an existing resource is removed from an associated resource group. As another example, a resource profile may be updated when an associated resource gains a credential allowing the resource to perform one or more new tasks, when a performance metric of an associated resource is updated, or when the resource's task history is updated. The one or more administrator devices may further provide task criteria to the resource management platform to guide task assignments. For example, a task criterion may limit tasks labeled as high difficulty to be assigned to resources with superior performance, lengthier years of experience, and/or ample availability. A user device may transmit an event submission to the resource management platform such that resource management platform may identify a resource-consuming event to begin the task assignment technique described in the present disclosure.

As an example, a task assignment process may be triggered by a user submitting an event submission to the resource management platform via the user device. The resource management platform next identifies a resource-consuming event based on the event submission and determines one or more associated resource-consuming tasks. The resource management platform next obtains new or updated resource statuses from resource device(s), resource profiles and resource groupings and optionally task criteria from administrator device(s). The resource management assigns the identified resource-consuming tasks to one or more resources associated with the one or more resource devices. The resource device may notify a corresponding resource the task assignment (e.g., via an interactive display).

In various examples, a dynamic resource management system may be configured as a cloud system having multiple components, including a central management platform, an administrator device, and one or more resource devices. The multiple components may be coupled to a common network, such that information may be transmitted from and to the resource devices. For example, the dynamic resource management system may determine resource availability, resource experience, and resource performance (e.g., as may be associated with the resource devices and users thereof). Further, the dynamic resource management system may store (e.g., at the central management platform), resource profiles (e.g., including the determined availability, experience, and performance), and resource groupings. Additionally, the dynamic resource management system may identify (e.g., by the central management platform) resource-consuming tasks and assign them to resources according to the stored resource profiles and resource groupings.

In various examples, the central management platform may identify or obtain a resource-consuming event. The resource-consuming event may be initiated by a user request via a user device that may be integral to or separate from the dynamic resource management system. The user device may be coupled to the common network connecting the multiple components of the dynamic resource management system. Next, the central management platform may identify multiple resource-consuming tasks associated with the resource-consuming event, such as based on one or more predetermined event-task associations. Once the tasks are identified, the central management platform may assign the resource-consuming tasks to the resources, such as based on availability, performance, and/or experience of each resource.

In various examples, resource information, such as availability, performance, and/or experience, may be stored in resource profiles, which may be stored centrally at a resource repository (e.g., of the central management platform) or distributedly at the multiple resource devices, among other examples. To maintain up-to-date resource information, resource devices may be monitored (e.g., self-monitored or by the central management platform) and resource information may be updated in real-time, near real-time, continually, intermittently, in set interval, and/or upon task completion. To reduce network load, resource information for each resource may be independently updated, such that resource information is pulled or pushed when information is updated. Further, some information may be updated more frequently than other information. For example, resource availability may be frequently updated (e.g., hourly or daily) whereas resource performance may be updated sparingly (e.g., weekly, monthly).

In various examples, grouping information may be stored in the administrator device and/or in the central management platform. To maintain up-to-date grouping information, whenever an updated resource grouping is obtained (e.g., via the administrator device), grouping information is updated to reflect the most up-to-date selections of primary and secondary resources. As an example, a first resource group that initially included a first primary resource, a second primary resource, a first secondary resource, and a second secondary resource may be updated to include the second primary resource, the first secondary resource, the second secondary resource, and a third secondary resource. Such change in resource selection may indicate a departure or a transfer-out associated with the first primary resource and a arrival or transfer-in associated with the third secondary resource.

In various examples, a resource-consuming event may be assigned to a primary resource, such as according to user designation or automatically according to resource profiles. For example, when a user submits an event submission, the user may designate a primary resource of choice to process as associated resource-consuming event. As another example, the resource management platform may assign the resource-consuming event to a primary resource based on resource profiles of the resources in the resource group to which the primary resource belongs. Subsequently, a resource-consuming task associated with the resource-consuming event may be assigned to one or more resources of the resource group to which the assigned primary resource belongs. Such an allocation technique enables all resource-consuming tasks to be assigned to the same resource group. In some instances, the central management platform may obtain task criteria associated with one or more of the resource-consuming tasks. The task criteria may guide the assignment of tasks such that resources satisfying the criteria may be assigned to corresponding tasks. As an example, a first task may be labeled as high difficulty and should be assigned with priority to resources with superior performance, lengthier years of experience, and/or ample availability. In contrast, a second task may be labeled as low difficulty and may be assigned to any resource with sufficient availability (e.g., without an additional requirement for performance or experience).

In various examples, a resource may submit a task request to the central management platform via an associated resource device to indicate its availability for task assignment. A task request may guide task assignment and optionally override default task assignment such that a task is assigned to a resource with a task request when the default task assignment would not have. For example, a resource may submit a task request to gain additional tasks beyond the default assignment limit. The allowed degree of deviation beyond the default assignment limit may vary according to each resource's resource profile (e.g., seniority, performance, task history). The task request mechanism may supplement the default task assignment process by bridging gaps created by the default task assignment process. In some examples, a task request may be submitted via a task dashboard of the resource device. The task dashboard may be controlled via an interactive display, which may further present task assignment information for a corresponding resource.

FIG. 1 illustrates an overview of an example system 100 for the dynamic resource management techniques described herein. As illustrated, system 100 comprises resource management platform 102, administrator device 104, first resource device 106, second resource device 108, user device 110, and network 112. In various examples, resource management platform 102, administrator device 104, first resource device 106, second resource device 108, and user device 110 communicate via network 112. For example, network 112 may comprise a local area network, a wireless network, or the Internet, or any combination thereof, among other examples.

Resource management platform 102, administrator device 104, first resource device 106, second resource device 108, and user device 110 may each be any of a variety of computing devices. For example, resource management platform 102, administrator device 104, first resource device 106, second resource device 108, and user device 110 may each be a distributed computing device comprised of a set of computing devices that provide the functionality described herein. As another example, administrator device 104, first resource device 106, second resource device 108, and user device 110 may each be a mobile computing device, a laptop computing device, a tablet computing device, and/or a desktop computing device, among other examples.

It will be appreciated that while system 100 is illustrated as comprising one resource management platform 102, one administrator device 104, two resource devices 106 and 108, and one user device 110, any number of such elements may be used in other examples. Further, the functionality described herein may be distributed among or otherwise implemented on any number of different computing devices in any of a variety of other configurations in other examples.

Resource management platform 102 is illustrated as comprising resource profile engine event processor 114, resource profile store 116, resource grouping store 118, task criteria store 120, and task manager 122. As described above, resource management platform 102 may identify a resource-consuming event, identify resource-consuming tasks, store resource profiles, store resource groupings, store task criteria, and/or assign tasks to resources and associated resource devices, such as resource devices 106 and 108.

Event processor 114 may identify a resource-consuming event, such as upon receipt of an event submission from user device 110 via event engine 134. The event submission may be transmitted from the user device to the event processor 114 via network 112. In some examples, the event submission is associated with a primary resource designated by the user device. In other examples, the event submission is associated with a primary resource designated by the event processor 114, such as automatically based at least in part on resource information (e.g., availability, experience). Event processor 114 may identify a set of resource-consuming tasks associated with the resource-consuming event. Event processor 114 may identify the set of resource-consuming tasks based on one or more pre-determined event-tasks associations.

Resource profile store 116 may obtain and/or store a set of resource profiles associated with a set of resources. Each resource may be associated with a resource device and in communication with resource profile store 116 via network 112. Resource information may be transmitted from resource devices 106, 108 to resource profile store 116 via network 112 or relayed to resource. Resource information may also be determined by resource profile engine 124 of administrator device 104. Resource profiles may contain resource information including resource performance (e.g., historic and/or recent), resource experience (e.g., years of experience), resource abilities (e.g., abilities to perform certain tasks), resource availability (e.g., instant, daily, weekly, monthly), resource limitations (e.g., placed by an administrator). Resource profile store 116 may be a distributed storage network configured to store resource information distributedly across a set of nodes on a connected network.

Resource grouping store 118 may obtain and/or store resource groupings each associating a selection of primary resource(s) and secondary resource(s) together in a common resource group. Resource groupings may be determined by and transmitted from resource grouping engine 126 of administrator device 104. To maintain up-to-date grouping information, resource grouping information may be regularly pulled or pushed from resource grouping engine 126. Grouping updates may also be transmitted when a grouping is changed, such as when a resource is removed from a resource group, when a resource is added to a resource group, or when a resource is transferred from a first resource group to a second resource group. In certain instances, a grouping rule may specify that at least one primary resource is included in each resource group. Resource grouping store 118 may be a distributed storage network configured to store grouping information distributedly across a set of nodes on a connected network.

Task criteria store 120 may obtain and/or store one or more task criteria associated with the resource-consuming tasks identified by event processor 114. For example, task criteria store 120 may obtain task criteria from task criteria engine 128 of administrator device 104. Task criteria may function as filters such that certain tasks may be assigned to resources satisfying the criteria. Some tasks may have several criteria whereas others may have no criteria. As examples, a task criterion may be evaluated to identify a set of primary and/or secondary resources, for example a resource satisfying an experience requirement, a resource matching an ability requirement, a resource exceeding a performance threshold, and/or a resource having availability satisfying an urgency rating (e.g., immediate availability would satisfy an immediate action). In certain instances, task criteria may be pre-associated with resource-consuming tasks and automatically identified upon determination of resource-consuming tasks.

Task manager 122 may assign each resource-consuming task determined by event processor 114 to a resource. The resource may be a primary resource or a secondary resource. Task manager 122 may assign resource-consuming tasks based on resource information stored at resource profile store 116 and grouping information stored at resource grouping store 118. For example, task manager 122 may assign resource-consuming tasks based on availability, performance, and/or experience of each resource. As another example, task manager 122 may assign resource-consuming tasks to resources such that all resource-consuming tasks associated with the same resource-consuming event are assigned to resources of the same resource group. In some instances, task manager 122 may also assign resource-consuming tasks according to one or more task criteria stored at task criteria store 120. Further, task manager 122 may obtain a task request from a task engine (e.g., task engine 130 or 132) of a resource device (e.g., resource device 106 or 108) indicating availability to obtain task assignment. Upon receipt of a task request, task manager may assign a resource-consuming task to the resource. In examples, assigning a task to a resource comprises providing an indication of the assigned task to a resource device associated with the resource (e.g., resource device 106 or 108).

Administrator device 104 is illustrated as comprising resource profile engine 124, resource grouping engine 126, task criteria engine 128. As noted above, resource profile engine may collect, determine, and/or transmit resource profiles. For example, resource profile engine may collect resource information from resource devices 106, 108, determine resource profile updates, and transmit resource profile updates to resource profile store 116. Resource grouping engine 126 may adjust resource groupings when a resource is moved in or out of a group, such as upon resource acquisition, resource departure, or resource transfer. Resource grouping engine 126 may then generate a resource grouping update and transmit the update to resource grouping store 118. Task criteria engine 128 may associate one or more task criteria to one or more resource-consuming tasks, such as via a pre-association step or optionally at the time of task assignment. Administrator device 104 may transmit task criteria, together or separately with resource information, resource profile updates, and/or resource grouping updates to resource management platform 102.

In some examples, system 100 may include multiple administrator devices associated with multiple administrators and with each administrator managing a selection of resource groups. For example, a first administrator may manage a first resource group and a second resource group, whereas a second administrator may manage a third resource group. Each administrator may maintain resource profiles of resources within the resource group(s) it manages. Similarly, each administrator device may maintain resource grouping of the resource group(s) it manages. Task criteria placed by each administrator may be considered during task assignment by the resource management platform only when tasks are being assigned to resources belonging to a resource group managed by the administrator.

Resource device 106 and resource device 108 are each illustrated as comprising task engine 130 and task engine 132, respectively. Task engines 130, 132 may present task assignment information by providing a task dashboard via an interactive display. Task dashboard may further allow a resource to submit a task request. Task engines 130 and 132 may each be a web-based or a native application (e.g., a web browser or an application provided by the resource management platform 102) in communication with the resource management platform 102. Resource device may transmit resource information such as availability and task completion status to the administrator device and/or directly to the resource management platform.

User device 110 is illustrated as comprising event engine 134. A user may submit an event submission via the event engine 134 such that the event processor 114 may identify a resource-consuming event to begin the task assignment technique described in the present disclosure. Event engine 134 may be a web-based or a native application (e.g., a web browser or an application provided by the resource management platform 102) in communication with the resource management platform 102. In some examples, the event may be updated by the user via the event engine to provide most updated event information. For example, the resource management platform 102, the administrator device 104, the resource device 106 or 108, or the user device 110 may identify an error associated with the submitted event request and the user may input modifications to the event request in response.

In certain examples, a resource-consuming event may be identified by the administrator device or directly by the resource management platform without an event submission from a user via a user device. For example, an administrator device (e.g., administrator device 104) may analyze user interaction with a web or an application provided by the resource management platform (e.g., resource management platform 102) and determine a resource-consuming event based on the user interaction. User interaction may include keyword search, webpage visited, user information input, and/or attention duration. As an example, the administrator device may determine that a user has interest in a product or service based on user interactions detected, initiates a resource-consuming event of user acquisition, and transmits it to the resource management platform to perform task determination and assignment.

Resource management platform 102 may perform multiple actions after obtaining indication(s) from administrator device 104, resource devices 106 and 108, or from user device 110. For example, event processor 114 may identify a resource-consuming event and associated resource-consuming tasks upon receipt of an event submission from event engine 130 of user device 110 (or optionally from administrator device 104). Resource profile store 116 may be updated upon obtaining indication from resource profile engine 124 of administrator device 10 indicating one or more resource profile updates. Resource grouping store 118 may be updated upon obtaining indication from resource grouping engine 126 of administrator device 104 indicating one or more resource grouping updates. Task criteria store 120 may be updated upon obtaining task criteria from task criteria engine 128 of administrator device 104 indicating one or more limitations to task assignment. Upon identifying resource-consuming tasks and optionally obtaining the latest updated resource profiles, resource groupings, task criteria, and optionally task request(s), task manager 122 may assign resource-consuming tasks to resource devices 106, 108 and provide indications to resource devices 106, 108 accordingly.

Figure 2A:
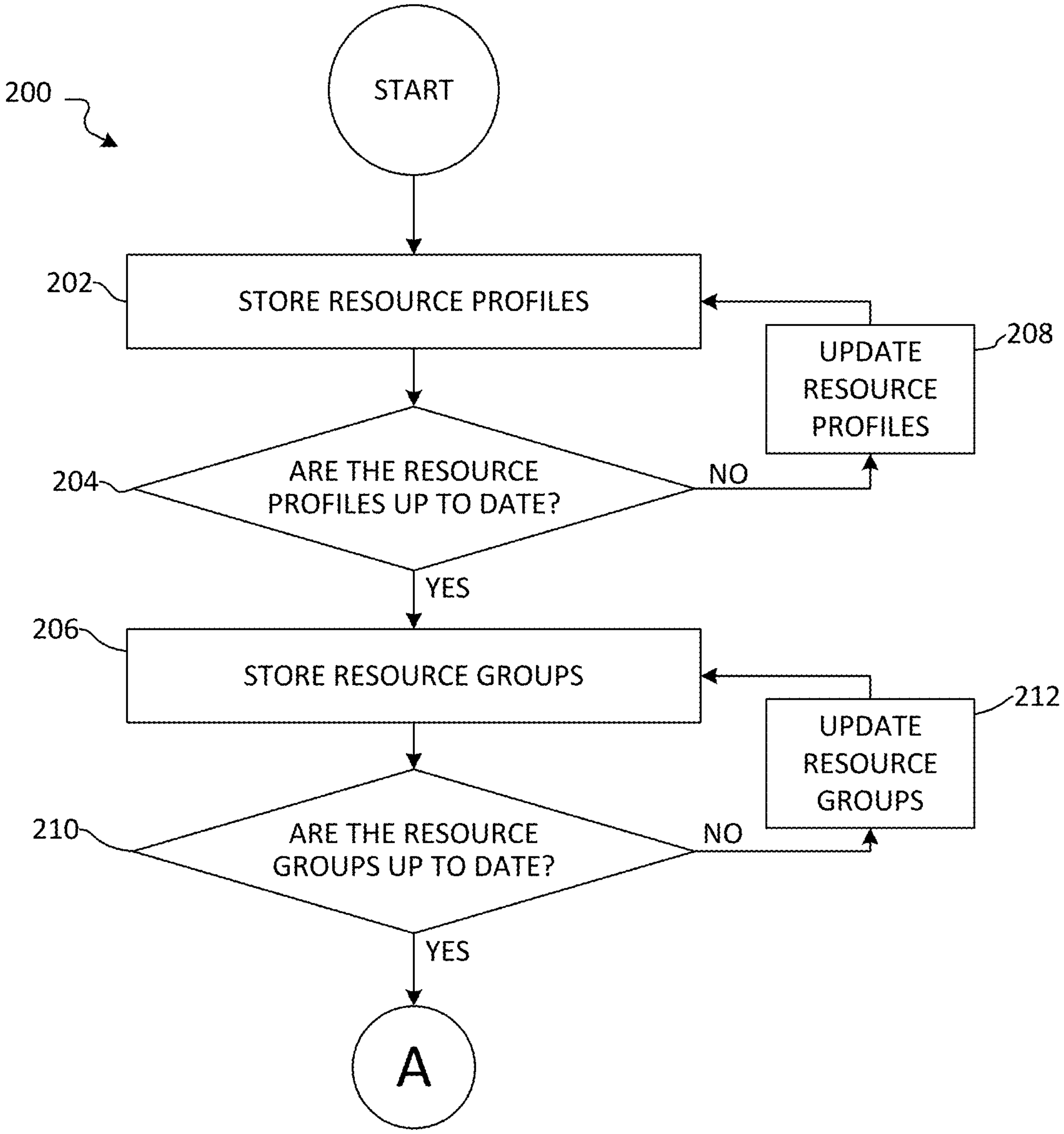
FIG. 2A illustrates an overview of an example method for managing resource profiles and resource groups via a resource management platform.

FIG. 2A illustrates an overview of an example method 200 for managing resource profiles and resource groups via a resource management platform. In various examples, aspects of method 200 are performed by a resource management platform, such as resource management platform 102 in FIG. 1. For example, aspects of method 200 may be performed to update resource profiles and/or resource groups of a resource management platform.

Method 200 begins at operation 202, where one or more resource profiles are obtained and stored. For example, resource profiles may be transmitted from resource devices (e.g., resource devices 106, 108) and/or administrator devices (e.g., administrator device 104). In some examples, at least part of the resource information may be transmitted from external sources including. As described above, resource information may include availability, performance, and/or experience.

At determination 204, it is determined whether the resource profiles, such as those stored in a resource profile store (e.g., resource profile store 116) are up-to-date. In some instances, determination 204 comprises comparing what is stored on the resource profile store with profile information stored on resource devices (e.g., resource devices 106, 108) and/or administrator devices (e.g., administrator device 104). In other examples, aspects of determination 204 are performed in response to an indication obtained from a resource or administrator device, as may be the case when an update is generated by such a device.

If, at determination 204, it is determined that the resource profiles are up-to-date, flow branches "YES" to operation 206, where resource groups are stored. At operation 206, resource groupings each associated with a selection of primary resource(s) and secondary resource(s) are stored, such as at a resource grouping store (e.g., resource grouping store 118). As described above, resource grouping information may be transmitted from an administrator device (e.g., administrator device 104) via a network (e.g., network 112). Flow then progresses to determination 210, which is described below.

If, however, it is instead determined at determination 204, that the resource profiles are not up-to-date, flow branches "NO" to operation 208, where resource profiles are updated. As described above, resource information may be updated to include the resource's latest availability, performance, and experience. Each resource profile may also be updated independently from other resource profiles.

Returning to determination 210, it is determined whether the resource groups, such as those stored in the resource grouping store, are up-to-date. In some instances, determination 210 comprises comparing what is stored on the resource grouping store with resource groupings designated on administrator devices (e.g., administrator device 104).

If, at determination 210, it is determined that the resource groupings are up-to-date, flow branches "YES" to a method (e.g., method 250 of FIG. 2B) for identifying and assigning resource-consuming tasks.

If, however, it is instead determined at determination 210, that the resource groupings are not up-to-date, flow branches "NO" to operation 212, where resource groupings are updated. As described above, resource groupings may be updated to replace an initial selection of primary resource(s) and secondary resource(s) with an updated selection of primary resource(s) and secondary resource(s), for example as may be obtained from an administrator device, among other examples.

Figure 2B:
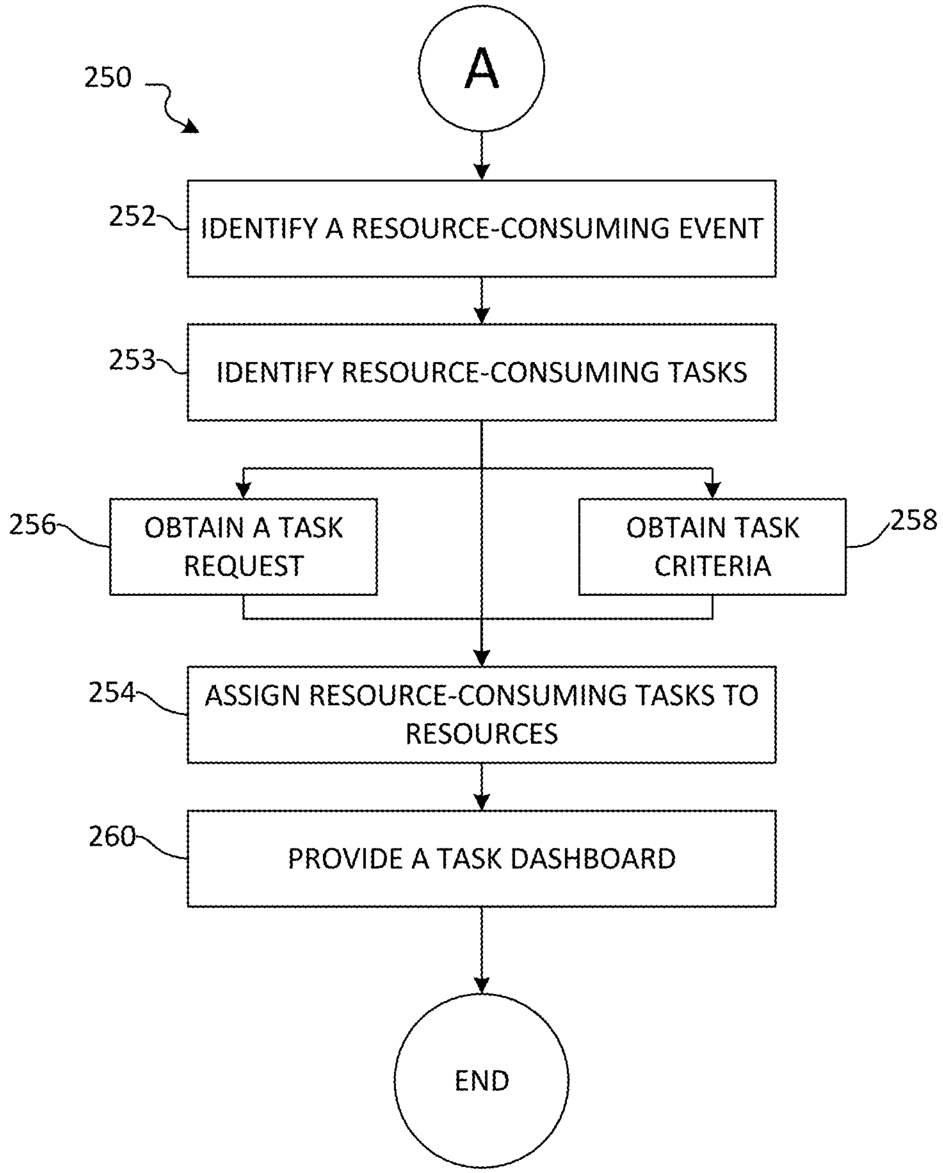
FIG. 2B illustrates an overview of an example method for identifying and assigning resource-consuming tasks via a resource management platform.

FIG. 2B illustrates an overview of an example method 250 for identifying and assigning resource-consuming tasks. In various examples, aspects of method 250 are performed by a resource management platform, such as resource management platform 102 in FIG. 1. For example, aspects of method 250 may be performed in association with an event-consuming event, as may be generated by a user device (e.g., user device 110 in FIG. 1).

Method 250 begins at operation 252, where resource-consuming event and associated resource-consuming tasks are identified. As described above, resource-consuming event may be identified based on an event request submitted by a user device or be identified based on user interaction with a web browser or an application.

Flow next progresses to operation 253, where a set of resource-consuming tasks associated with the resource-consuming event are identified. In various examples, resource-consuming tasks may be determined based on one or more event-tasks associations pre-determined by the resource management platform or an administrator device. For example, a resource management platform may maintain a relationship tree or table associating each type of resource-consuming event to one or more resource-consuming tasks. Once a resource-consuming event is identified, the relationship tree or table may next be used to identify the associated resource-consuming tasks. Alternatively, an administrator may indicate what resource-consuming tasks need to be processed and transmit said information to the resource management platform, such as alongside any task criteria the administrator provides.

Flow may directly progress to operation 254, where resource-consuming tasks are assigned to resources. Here, task assignment may be performed based at least in part on resource information and resource grouping. As examples, resource-intensive tasks may be assigned to resources with high availability, while high-difficulty tasks may be assigned to resources with good performance and/or long years of experience.

In some examples, flow may first progress to operation 256 prior to progressing to operation 254. At operation 256, a task request may be obtained to indicate that a resource has availability to take on additional task assignment. The task request may be obtained from a resource device (e.g., resource device 106 or 108). Should a task request be obtained, resource-intensive tasks may be assigned at operation 254 based at least in part on the task request, such as in addition to considering resource availability, performance, and/or experience. While examples are described herein in which a resource device generates a task request, it will be appreciated that, in other examples, a task request may be provided by the administrator device for a resource device in response to determining resource availability. As a further example, a resource device may provide updates to a status repository maintained by an administrator device. Thus, it will be appreciated that any of a variety of techniques may be used to determine whether a resource device may obtain a task assignment.

In other examples, flow may first progress to operation 258 prior to progressing to operation 254. At operation 258, one or more task criteria may be obtained or otherwise obtained, such as from an administrator device (e.g., administrator device 104). The one or more task criteria may indicate conditions of task assignment that may be used at operation 254. As examples, a resource-consuming task may not be assigned to a secondary resource if accompanied with a task criterion indicating primary resource assignment preferred. In some instances, the task criteria may be an additional consideration rather than a replacement for resource information-based task assignment that may be performed at operation 254.

Flow may then progress to operation 260, where a task dashboard may be provided. Task dashboard indicating a task assignment that was generated at operation 254 may be provided via a task manager (e.g., task manager 122) of a resource management platform (e.g., resource management platform 102). For example, the task dashboard may be accessible by an administrator device (e.g., administrator device 104) and/or by resource devices (e.g., resource device 106 and/or 108).

Figure 3:
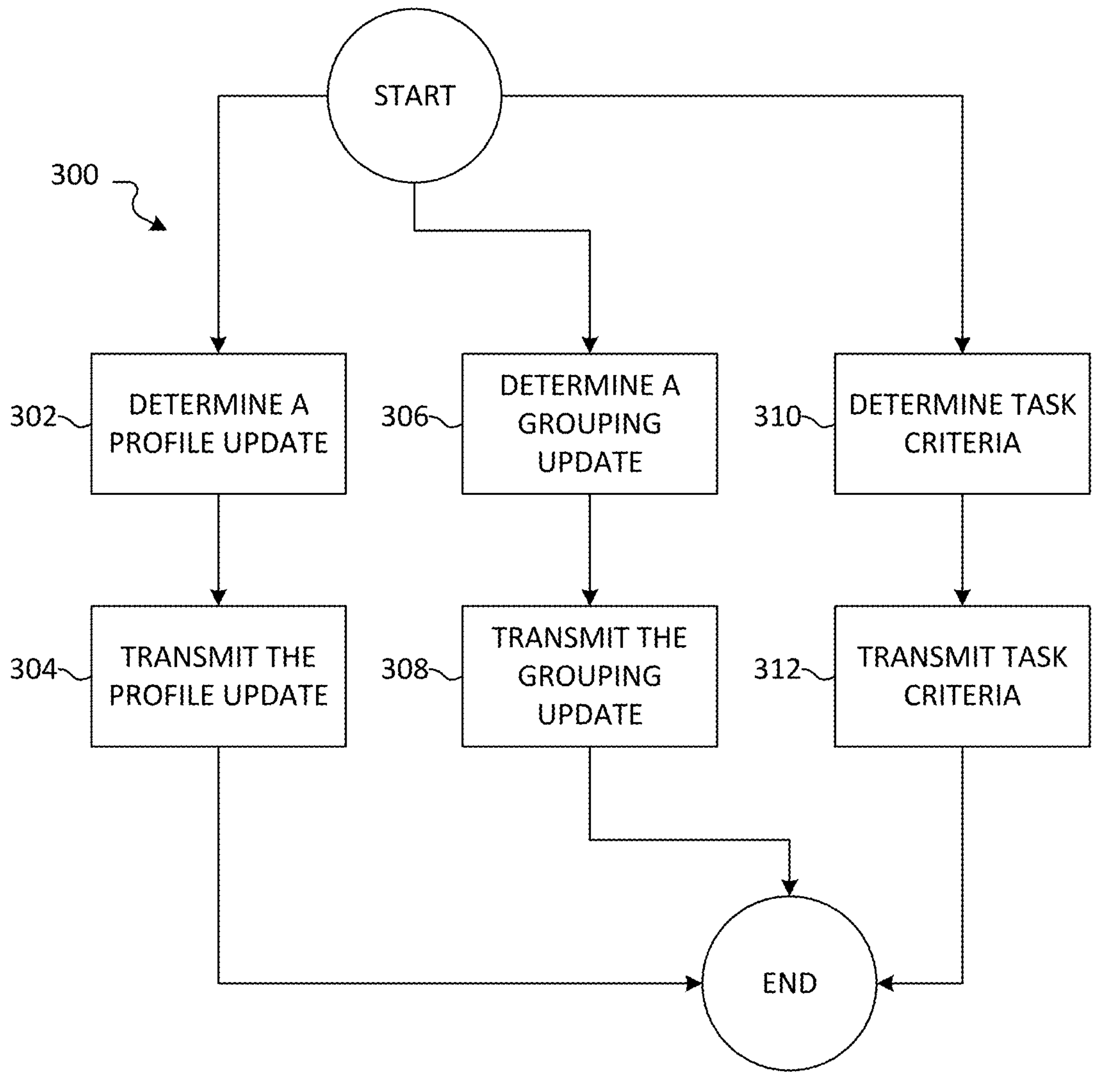
FIG. 3 illustrates an overview of an example method for obtaining and transmitting profile updates, grouping updates, and tasks criteria via an administrator device.

FIG. 3 illustrates an overview of an example method 300 for obtaining and transmitting profile updates, grouping updates, and tasks criteria. In various examples, aspects of method 300 are performed by an administrator device (e.g., administrator device 104 in FIG. 1) in communication with a dynamic resource management system (e.g., dynamic resource management system 100) via a network (e.g., network 112).

In a first instance, flow begins at operation 302, where one or more profile updates may be determined. A profile update may include an update to a resource's skillset, credentials, task history, past performance (e.g., efficiency and/or error rate), projected performance, availability, working relationships (e.g., past and/or current working relationships with other resources and/or users). The profile updates may be determined based on input obtained at an interactive interface of the administrator device. Alternatively, the profile updates may be determined automatically based on resource information obtained from resource devices (e.g., resource devices 106, 108).

Upon determination of the profile updates, flow may progress to operation 304, where the profile updates are transmitted from the administrator device to a resource management platform (e.g., resource management platform 102). In some examples, each profile update includes only the updated resource profiles compared to a most recent set of resource profiles such that the resource management platform selectively replaces only a selection of resource profiles stored in its resource profile store according to the updated resource profiles. As another example, each profile update includes only updated metrics such that no resource profile would be replaced unless every single metric of the resource profile is updated.

In a second instance, flow begins at operation 306, where one or more grouping updates may be determined. A grouping update may include an update to the resource composition (i.e., which primary resource(s) and/or secondary resource(s) belongs) of resource group, the type of tasks resource group is capable of processing, or a region served by a resource group. The grouping updates may be determined based on input obtained at an interactive interface of the administrator device. Alternatively, the grouping updates may be determined automatically based on resource acquisitions, resource removals, and/or resource transfers.

Upon determination of the grouping updates, flow may progress to operation 308, where the grouping updates are transmitted from the administrator device to a resource management platform (e.g., resource management platform 102). In some examples, each grouping update includes only the updated resource groupings compared to a most recent set of resource groupings such that the resource management platform selectively replaces only a selection of resource groupings stored in its resource grouping store according to the updated resource groupings. As another example, each grouping update includes only updated metrics such that no resource grouping would be replaced unless every single metric of the resource group is updated.

In a third instance, flow begins at operation 310, where one or more task criteria may be determined. A task criterion may function may limit assignment of one or more specified tasks according to an experience requirement, an ability requirement, a performance threshold, and/or a resource availability threshold. In some examples, a task criterion may mark each task with a label (e.g., by difficulty) that corresponds to one or more requirements. In certain instances, task criteria may be pre-associated with resource-consuming tasks and automatically identified upon determination of resource-consuming tasks. The task criteria may be determined based on input obtained at an interactive interface of the administrator device. Alternatively, the task criteria may be determined automatically based on one or more pre-determined criteria-task associations.

Upon determination of the task criteria, flow may progress to operation 312, where the task criteria are transmitted from the administrator device to a resource management platform (e.g., resource management platform 102). Upon receipt of task criteria, the resource management platform may correlate each task criterion with a specified resource-consuming task and maintain the correlations in a task criteria store. In certain examples, the task criteria-task correlations may be associated with the event-task association tree or table. In various examples, only modifications to task criteria compared to a most recently transmitted set of task criteria are transmitted from the administrator device to the resource management platform to reduce network load.

Figure 4:
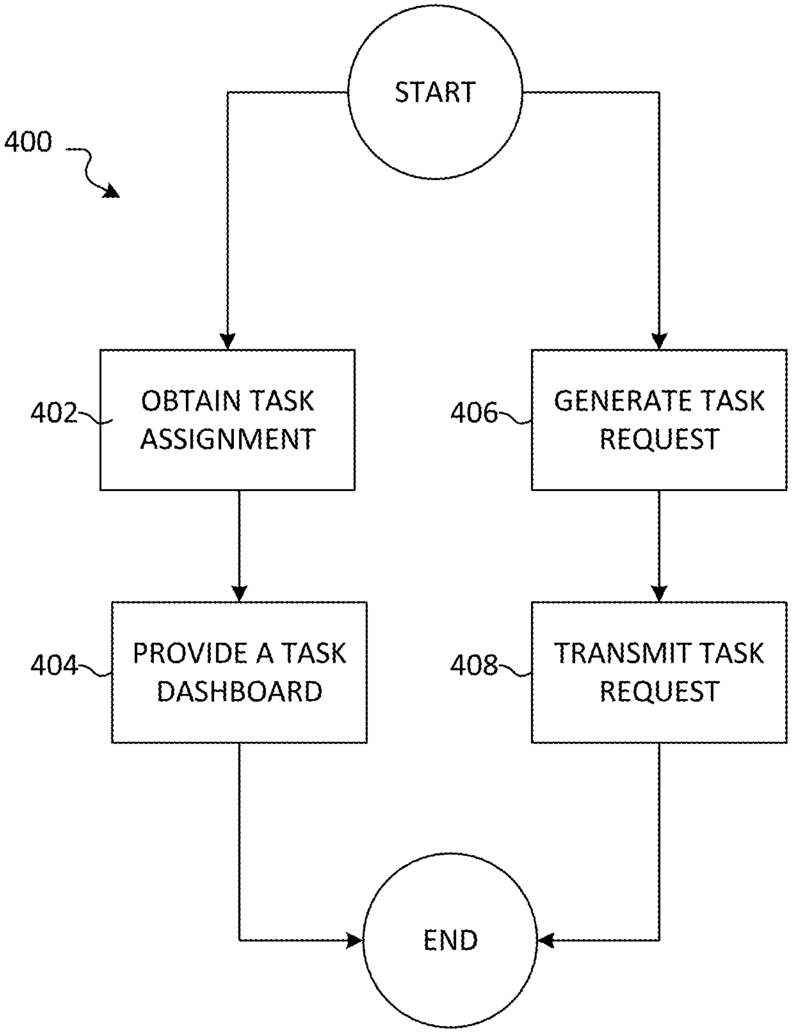
FIG. 4 illustrates an overview of an example method for obtaining and transmitting task assignments and task requests via a resource device.

FIG. 4 illustrates an overview of an example method for obtaining and transmitting task assignments and task requests via a resource device. In various examples, aspects of method 400 are performed by a resource device, such as resource device 106 or 108 in FIG. 1. Method 400 may be performed in association with a dynamic resource management system (e.g., dynamic resource management system 100) via a network (e.g., network 112).

In a first instance, flow begins at operation 402, where one or more task assignments may be obtained. For example, task assignments may be transmitted from a resource management platform (e.g., resource management platform 102) via a network (e.g., network 112). Upon receipt of the task assignments, flow may progress to operation 404, where a task dashboard presenting the task assignments may be provided, such as via a task engine (e.g., task engine 130 or 132) of a corresponding resource device (e.g., resource device 106 or 108). In some examples, each task may be labeled with a priority to indicate urgency, importance, and/or deadline to help guide each resource's task management. In certain examples, a task assignment may replace assigned tasks with new or modified tasks, such as when new user information becomes available.

In a second instance, flow instead begins at operation 406, where one or more task requests may be generated. For example, a resource may instruct resource device to generate a task request indicating the resource's availability to obtain task assignments. A task request may guide task assignment and optionally override default task assignment such that a task is assigned to a resource with a task request when the default task assignment would not have, such as for a resource to seek additional tasks beyond a default assignment limit. The task request may be created using a task engine (e.g., task engine 130 or 132) of a corresponding resource device (e.g., resource device 106 or 108). Once the task request is created, flow may progress to operation 408, where the task request is transmitted from the resource device to a resource management platform (e.g., resource management platform 102).

In certain examples, resources may be human resources, such as loan consultants and/or loan consultant associates. For example, primary resources may be loan consultants and secondary resources may be loan consultant associates. A user may be a loan seeking applicant submitting a loan application via a user device. Upon receipt of the loan application, a human resource management platform may identify a loan processing event associated with the loan application, identify tasks requiring human resource, and assign the tasks to the human resources. A manager may operate an administrator device to construct teams of resources and place conditions on task assignments. However, while example resources, events, and tasks are described, it will be appreciated that aspects of the present disclosure may be similarly applied in any of a variety of other contexts.

FIGS. 5A-5J illustrate overviews of example user interface aspects for a dynamic resource management system according to aspects described herein. For example, such user interface aspects may be generated by a computing device.

Figure 5A:
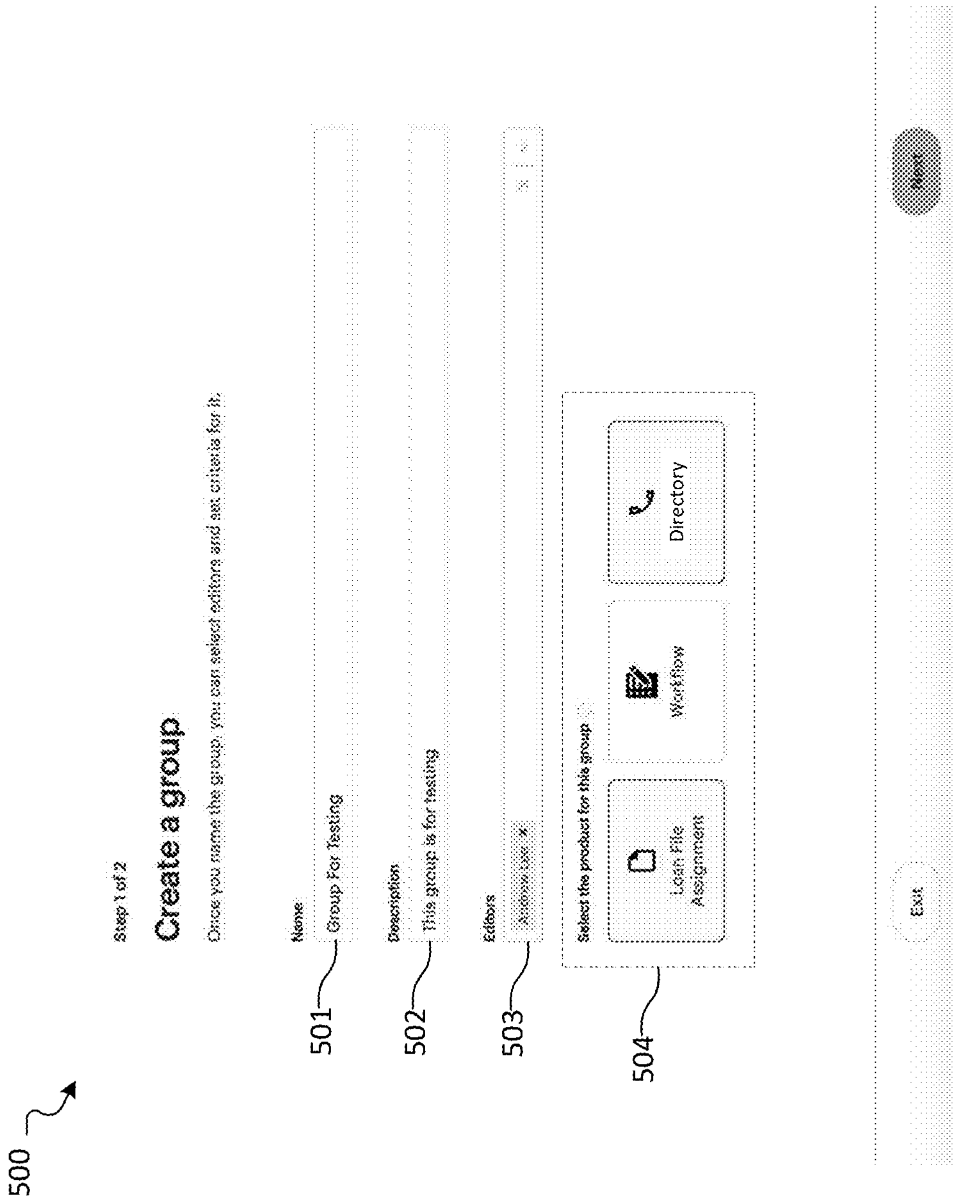
FIGS. 5A-5J illustrate overviews of example user interface aspects for a dynamic resource management system according to aspects described herein.

FIG. 5A illustrates an example group creating screen 500. As illustrated, group creating screen 500 comprises a text field for group name 501, a text field group description 502, a text field group editors 503, and a selection field for product for the group 504. Group creating screen 500 may be displayed on an administration device, such as during the creation of a resource group by an administrator controlling the administration device. As shown, a group name, a group description, one or more group editors, and one or more products may be associated with the new resource group during group creation. Group creating screen 500 may flow to group members editing screen 510 during the group creation process. In certain examples, one or more group creation rules may be implemented to guide group creation, such as to require each group name to be unique from existing groups or to require each group be assigned with at least an administrator. In certain examples, one or more group removal rules may be implemented to guide group removal, such as to require a group's members be fully removed before the group may be removed.

Figure 5B:
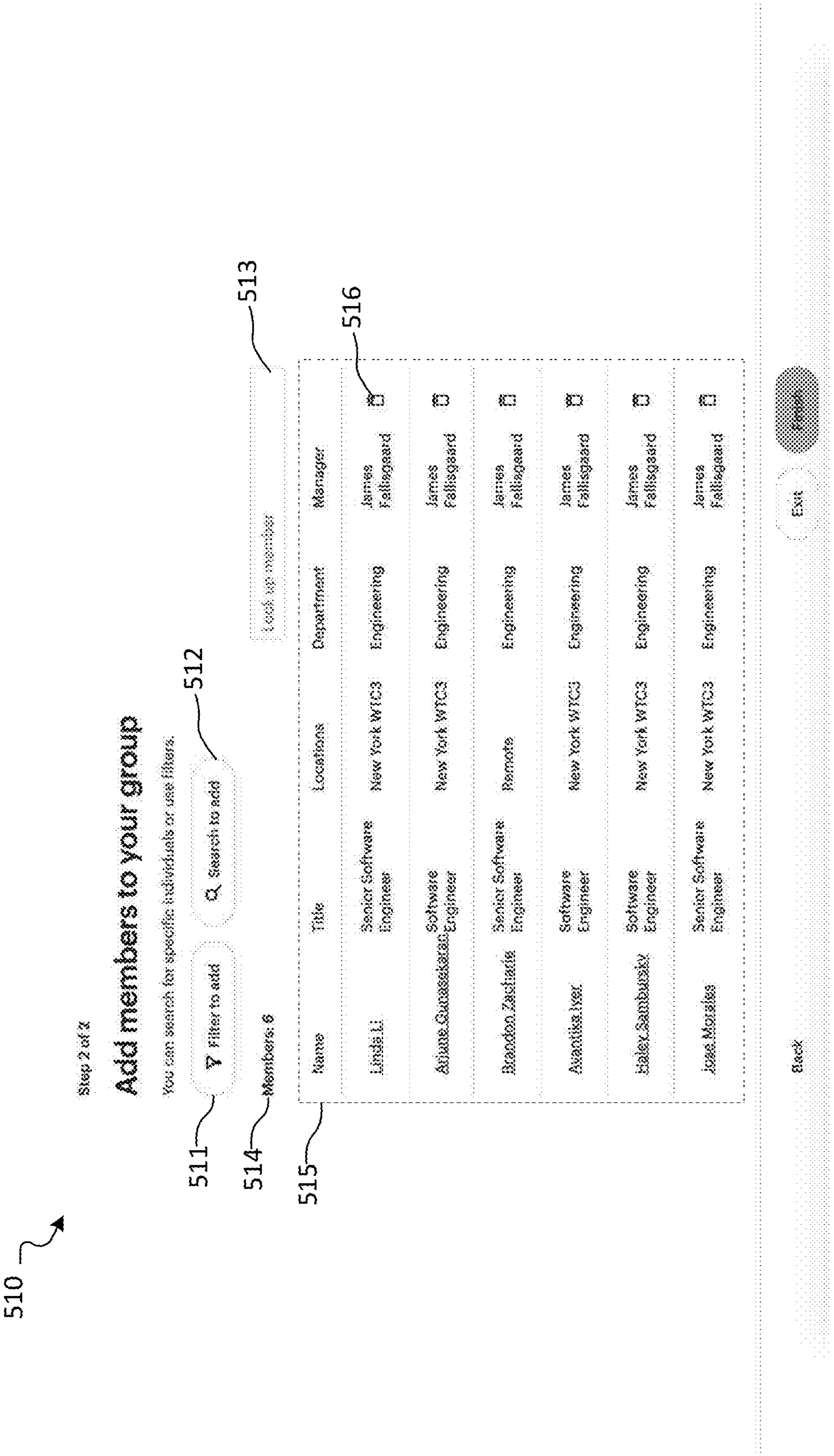

FIG. 5B illustrates an example group members editing screen 510. As illustrated, group members editing screen 510 comprises a selection field for filters 511, a text field for new member search 512, a text field for existing group member search 513, a member count 514, a member information section 515 showing member names, titles, locations, departments, managers, and a member action field for member deletion 516. Group members editing screen 510 may be displayed on an administration device, such as during the creation of a resource group by an administrator controlling the administration device. As shown, members may be added to a new resource group by searching for available members, with optional filters, and removing accidental additions if needed.

Figure 5C:
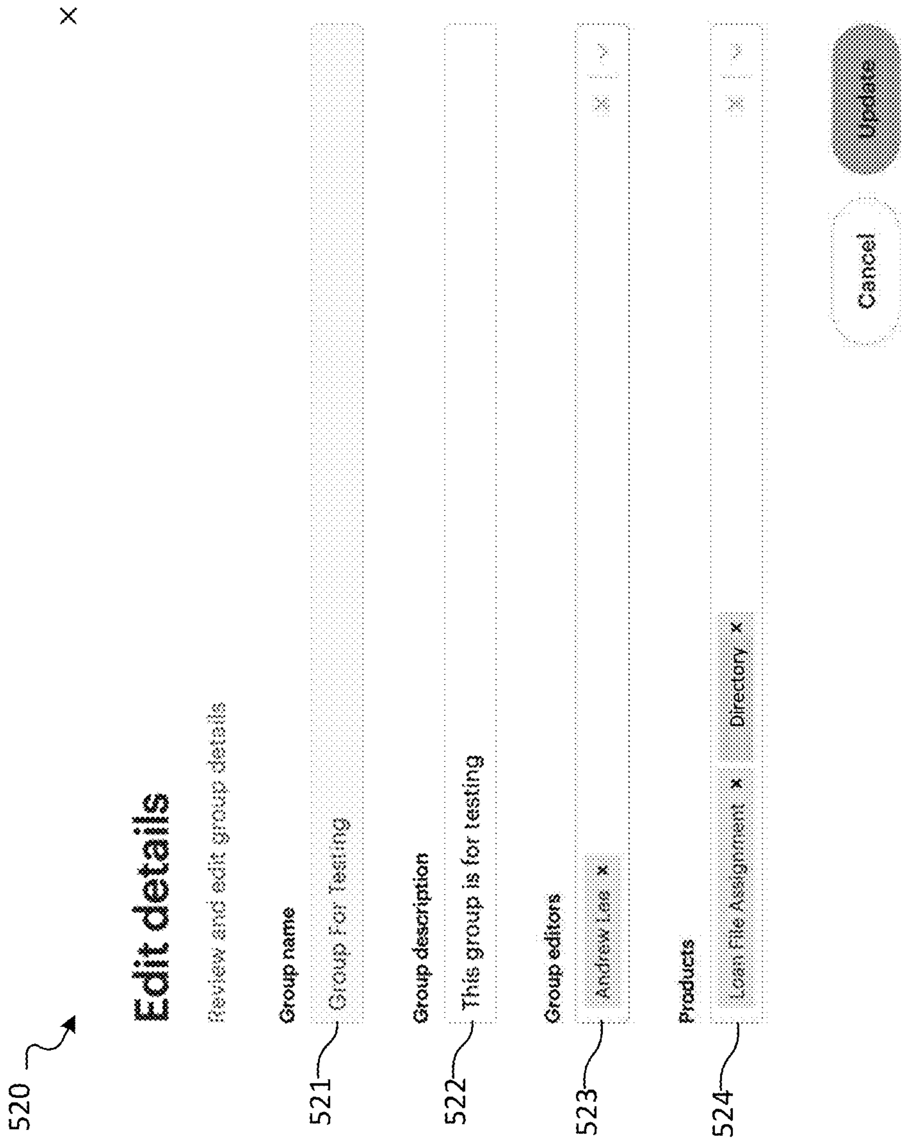

FIG. 5C illustrates an example group information editing screen 520. As illustrated, group information editing screen 520 comprises a display field for group name 521, a text field for group description 522, a selection field for group editors 523, and a selection field for products 524. Each of the selection field for group editors 523 and the selection field for products 524 includes a drop-down arrow for a drop-down menu. Group information editing screen 520 may be displayed on an administration device, such as during modification of a resource group by an administrator controlling the administration device. As shown, group name may be verified, group description may be modified, group editors may be reelected, and products associated with the group may be reelected.

Figure 5D:
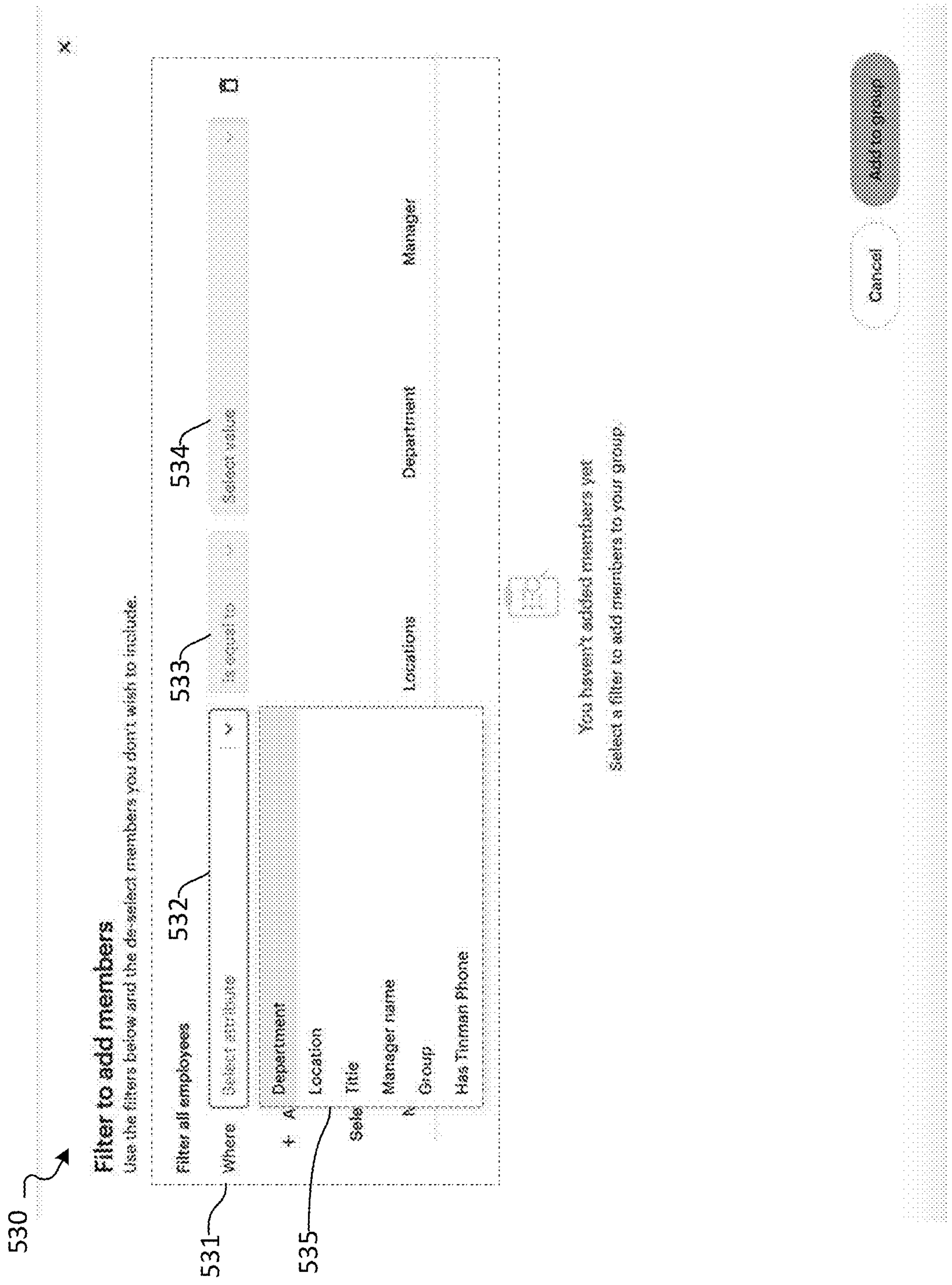

FIG. 5D illustrates an example new group member filter screen 530. As illustrated, the new group member filter screen 530 comprises an entry field 531 containing a selection field for attributes 532, a selection field for logic 533, and a selection field for value 534. Each of the selection field for attributes 532, selection field for logic 533, and selection field for value 534 includes a drop-down arrow for a drop-down menu. Attribute drop-down menu 535 is illustrated. New group member filter screen 530 may be displayed on an administration device, such as during modification of a resource group by an administrator controlling the administration device. As shown, a new member may be added to an existing resource group via a filter tool allowing the administrator to search available members by various attributes.

Figure 5E:
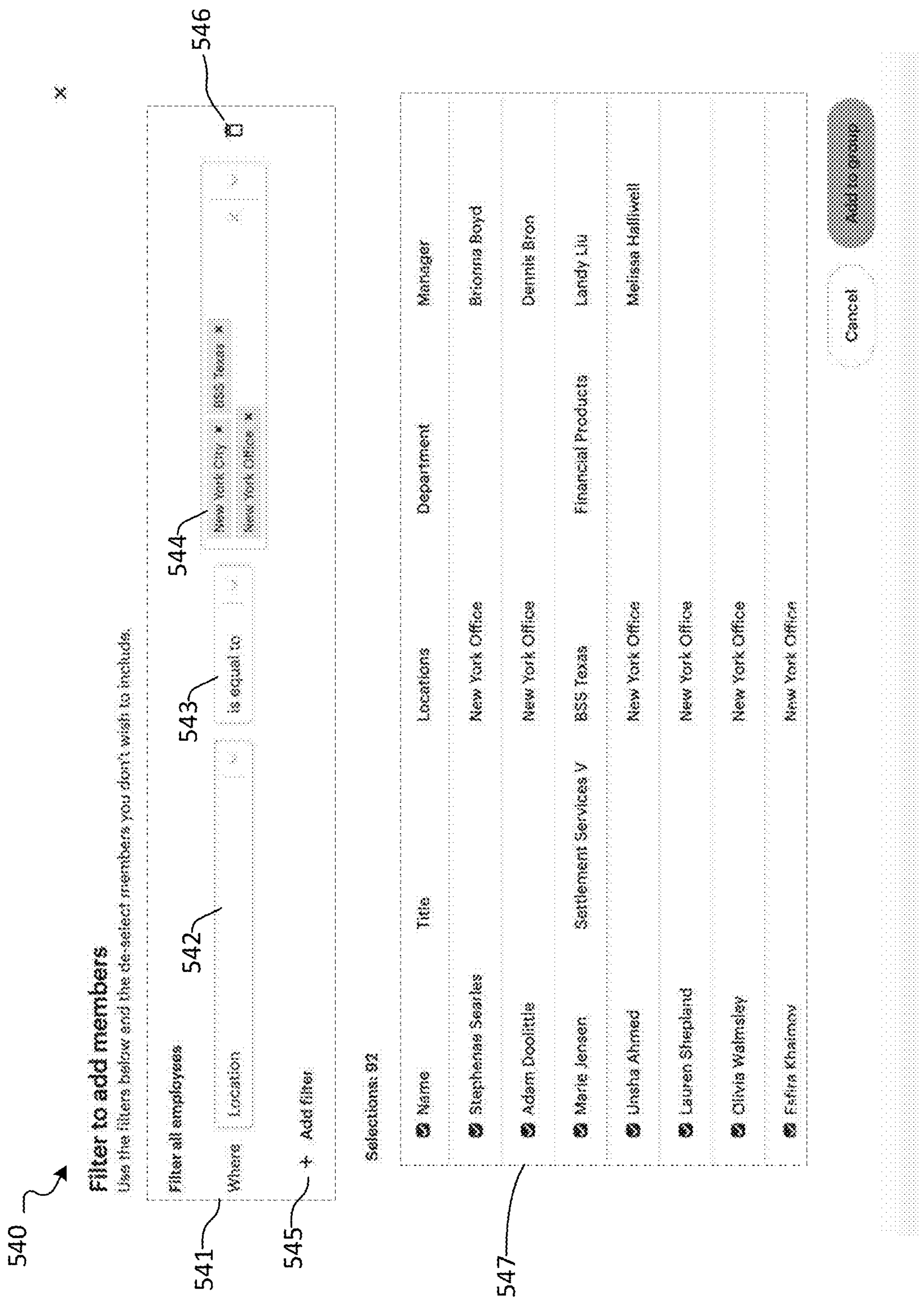

FIG. 5E illustrates another example new group member filter screen 540. As illustrated, new group member filter screen 540 comprises a filter field 541 containing a selection field for attributes 542 (illustrated with a selection of "location"), a selection field for logic 543 (illustrated with a selection of "is equal to"), and a selection field for value 544 (illustrated with selections of "New York City," "BSS Texas," and "New York Office"). Further, filter field 541 further comprises an action field for add filter 545 and an action field for filter deletion 546. As illustrated, New group member filter screen 540 further comprises a member information section 547 showing names, titles, locations, departments, and managers of potential new members. Similar to new group member filter screen 530, new group member filter screen 540 may be displayed on an administration device, such as during modification of a resource group by an administrator controlling the administration device. As shown, new members may be added to an existing resource group via a filter tool allowing the administrator to search available members by various attributes, with to-be-added members listed on the page with pertinent member information.

Figure 5F:
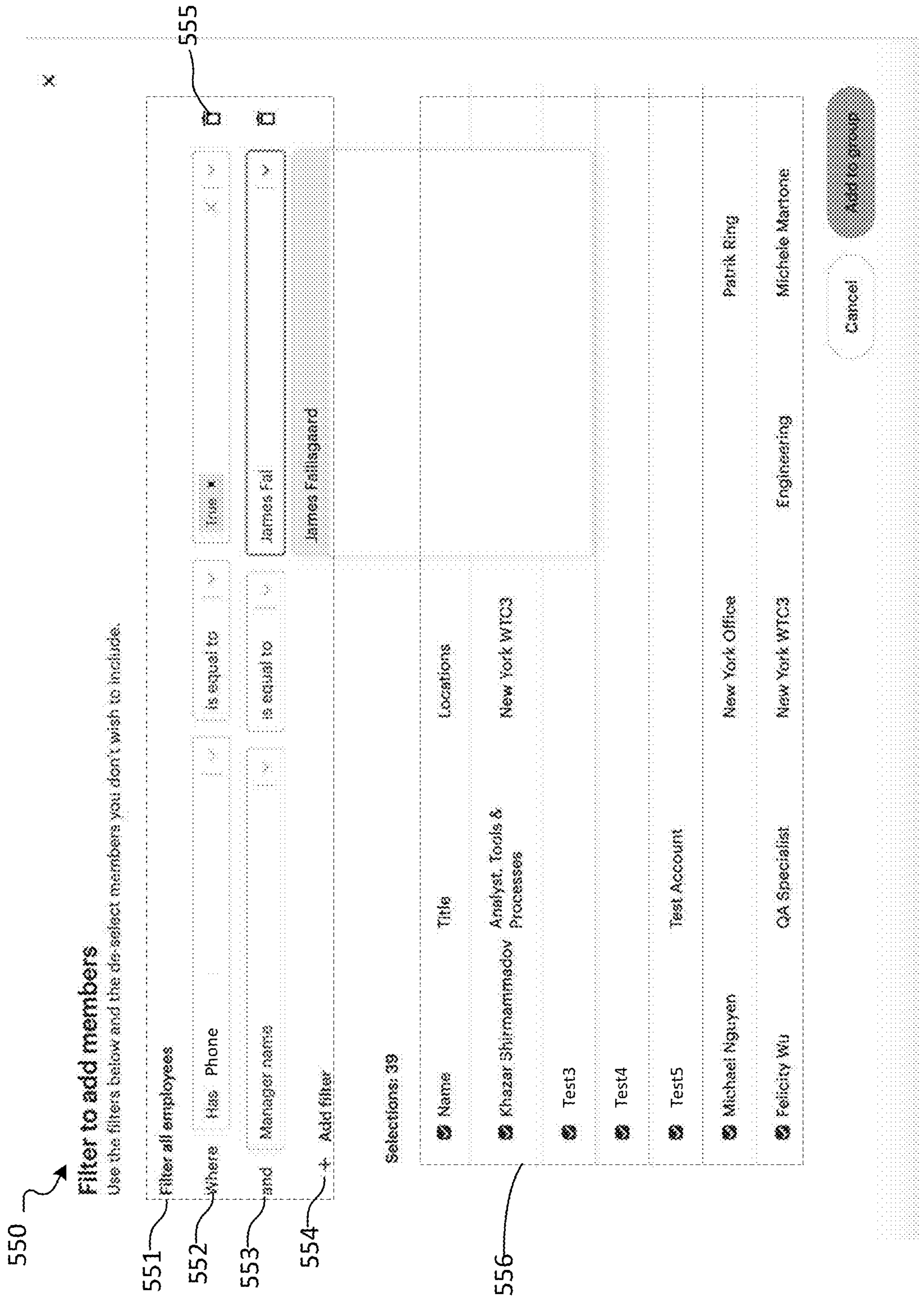

FIG. 5F illustrates another example new group member filter screen 550. As illustrated, new group member filter screen 550 comprises a filter field 551 containing a first filter 552, a second filter 553, an action field for filter add 554, and an action field for filter deletion 555. Further, new group member filter screen 550 comprises a member information section 556 similar to member information section 547. Similar to new group member filter screens 530, 540, new group member filter screen 550 may be displayed on an administration device, such as during modification of a resource group by an administrator controlling the administration device. As shown, new members may be added to an existing resource group via a filter tool allowing the administrator to search available members by multiple various attributes, with to-be-added members listed on the page with pertinent member information.

Figure 5G:
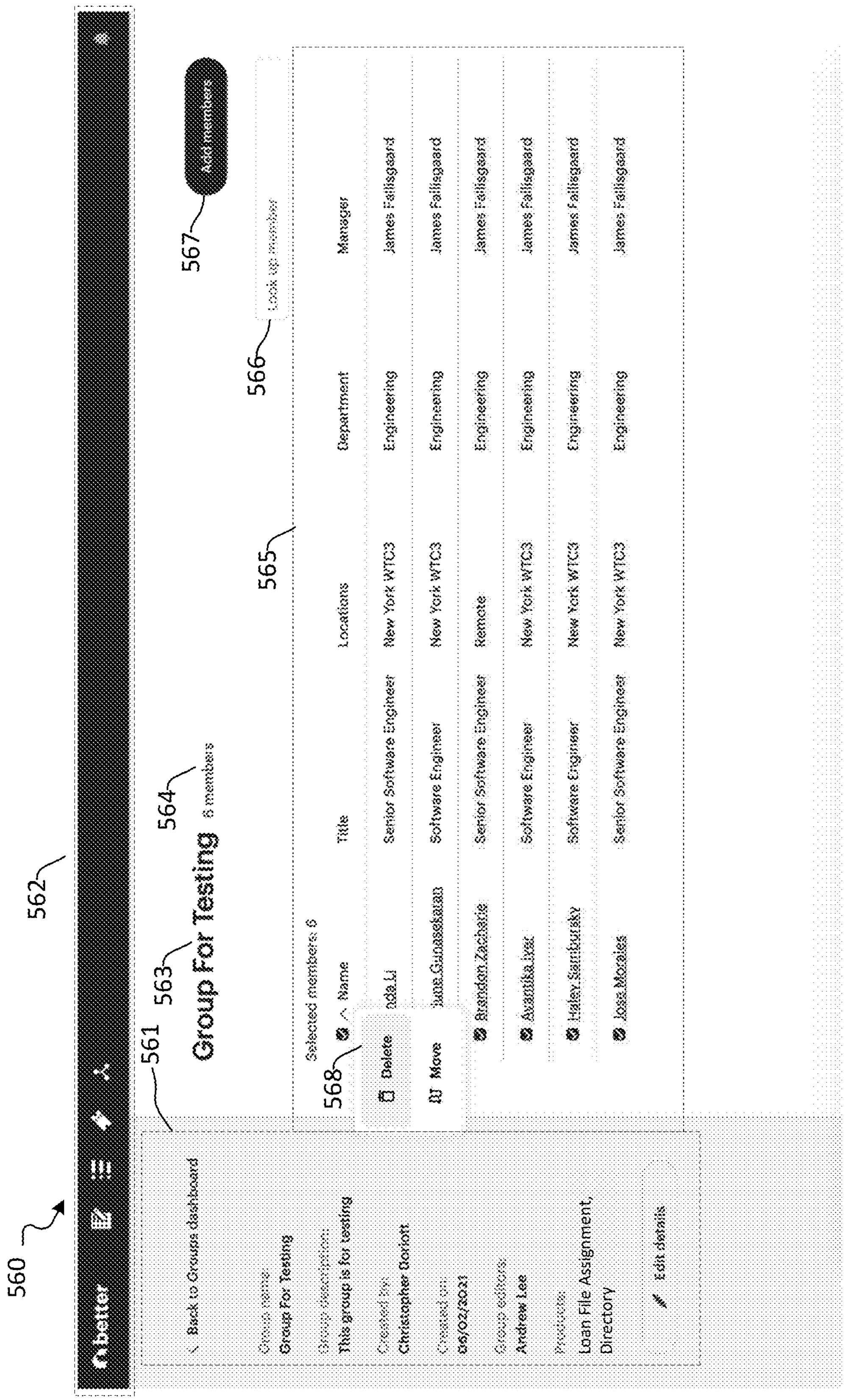

FIG. 5G illustrates a group information screen 560. As illustrated, group information screen 560 comprises a group information field 561, a title bar 562, group name 564, group member count 564, group member information field 565, a member look up text field 566, a member add action field 567, and a member management action filed 568. As shown, group information field 561 shows group name, group description, group creator, group creation date, group editor, group products, and an edit detail action field. Additionally, group member information field 565 shows names, titles, locations, departments, and managers of the group members, and may include a delete action field and a move action field upon selecting one or more members. Group information screen 560 may be displayed on an administration device, such as during modification of a resource group by an administrator controlling the administration device. As shown, group information of an existing resource group, including group name, description, creation date, creator, editor, related products, and group members may be moved or deleted.

Figure 5H:
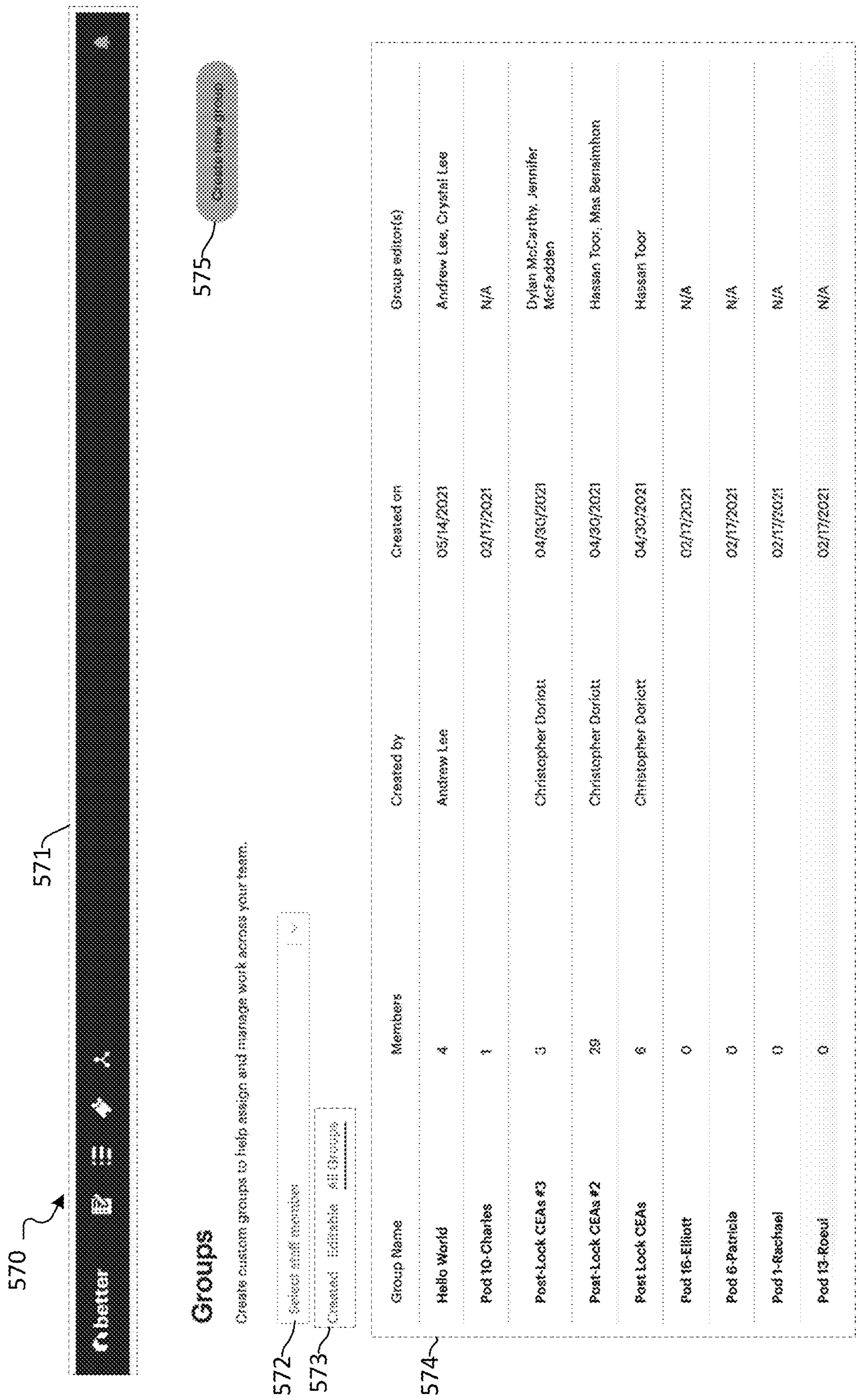

FIG. 5H illustrates a group listing screen 570. As illustrated, group listing screen 570 comprises a title bar 571, a staff member selection field 572, a group type selection field 573, a group information section 574, and a create new group action field 575. As shown, the group information section 574 lists group name, member count, group creator, group creation date, and group editors. Group listing screen 570 may be displayed on an administration device, such as during creation of a resource group by an administrator controlling the administration device. As shown, group information of existing resource groups are shown, including a group filter to aid navigation and an action button for creating a new group, which may flow to group creating screen 500 of FIG. 5A.

Figure 5I:
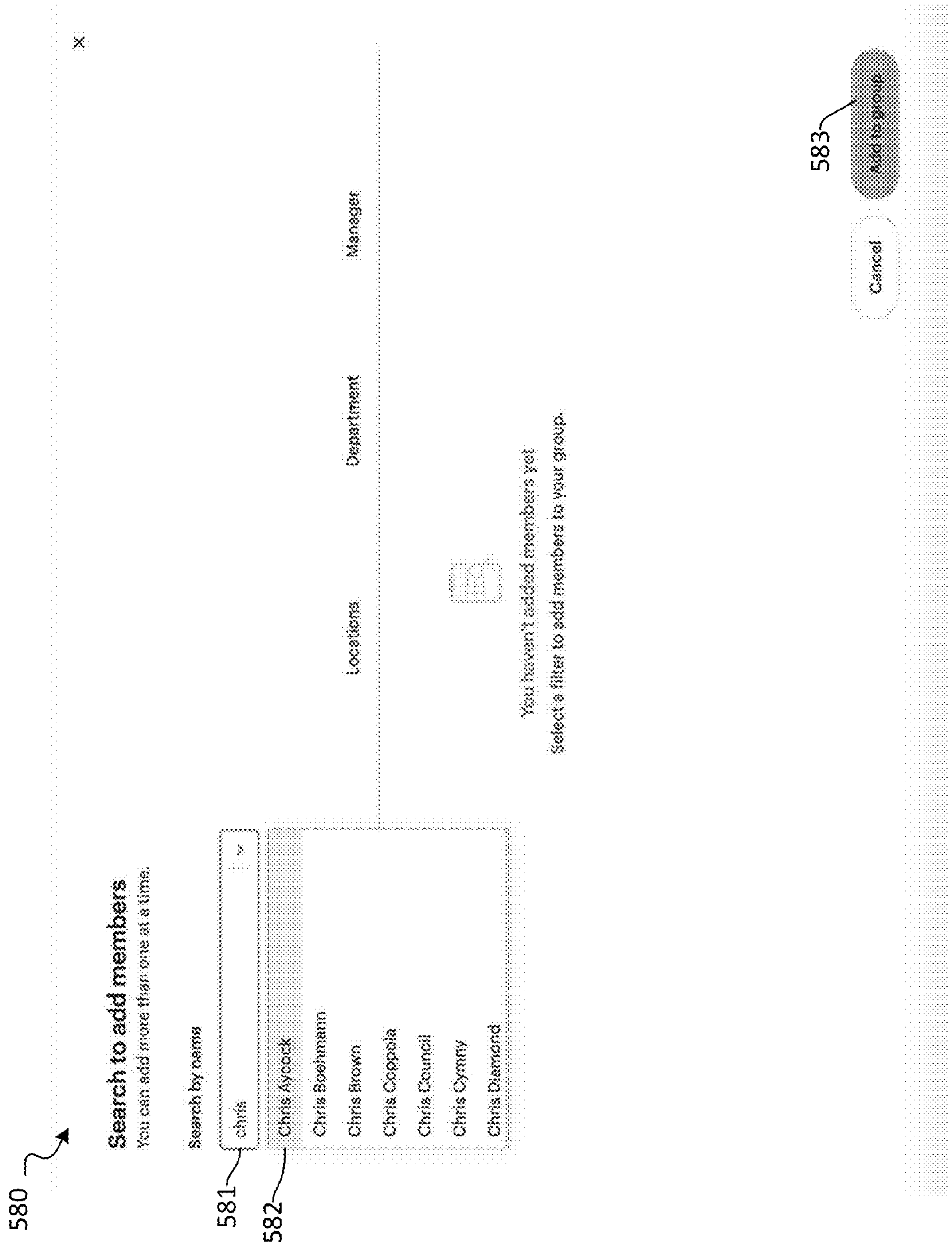

FIG. 5I illustrates a member add screen 580. As illustrated, member add screen 580 comprises a member search field 581, a member selection menu 582 and a add-to-group action field 583. Member add screen 580 may be displayed on an administration device, such as during modification of a resource group by an administrator controlling the administration device. As shown, group members may be added by name.

Figure 5J:
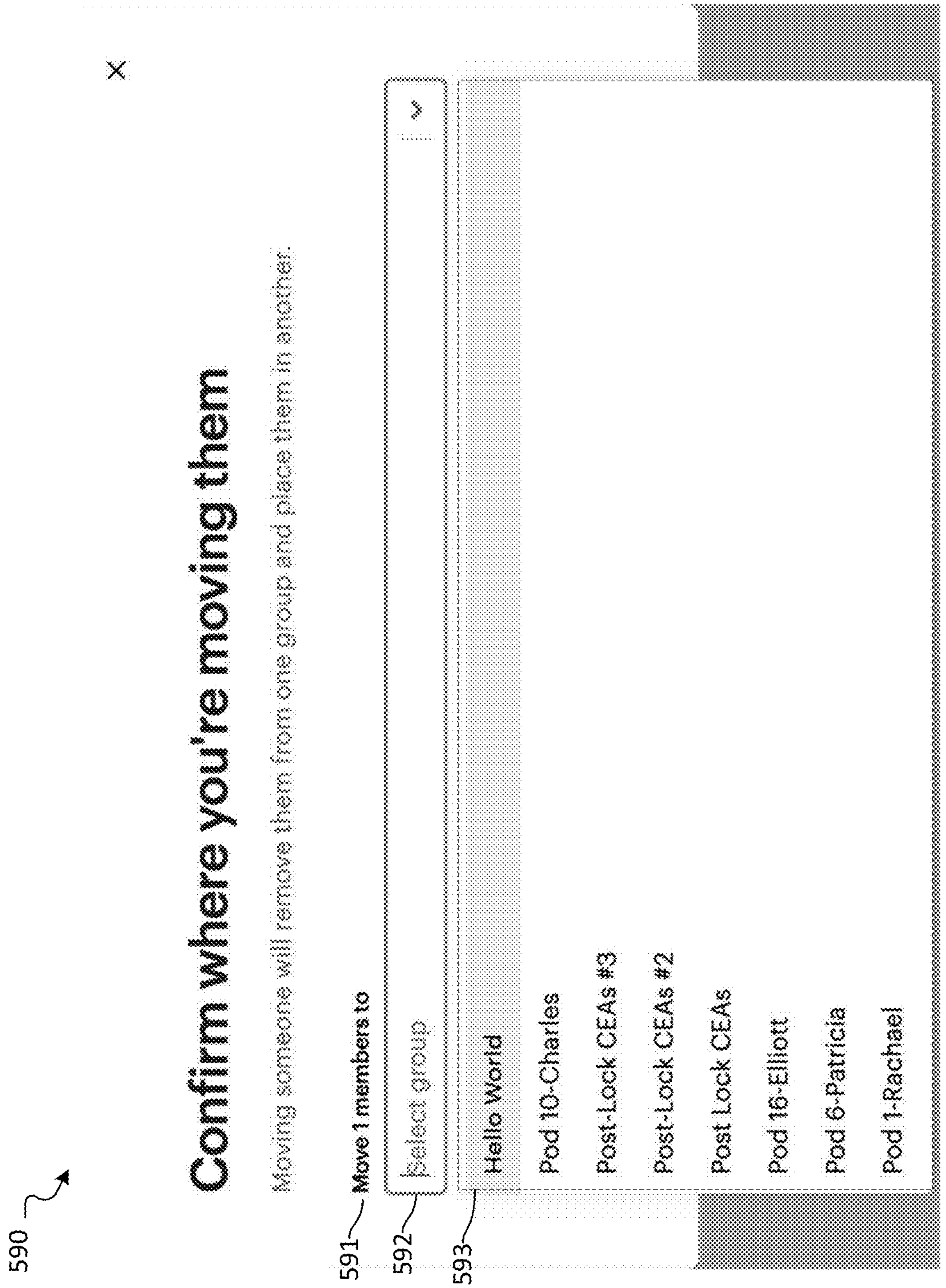

FIG. 5J illustrates a member move screen 590. As illustrated, member move screen 901 includes a member count for members to be moved 591, a designation field 592, and a selection menu 593 for the designation field. Member move screen 580 may be displayed on an administration device, such as during modification of a resource group by an administrator controlling the administration device. As shown, group members may be selected and moved by name.

Figure 6:
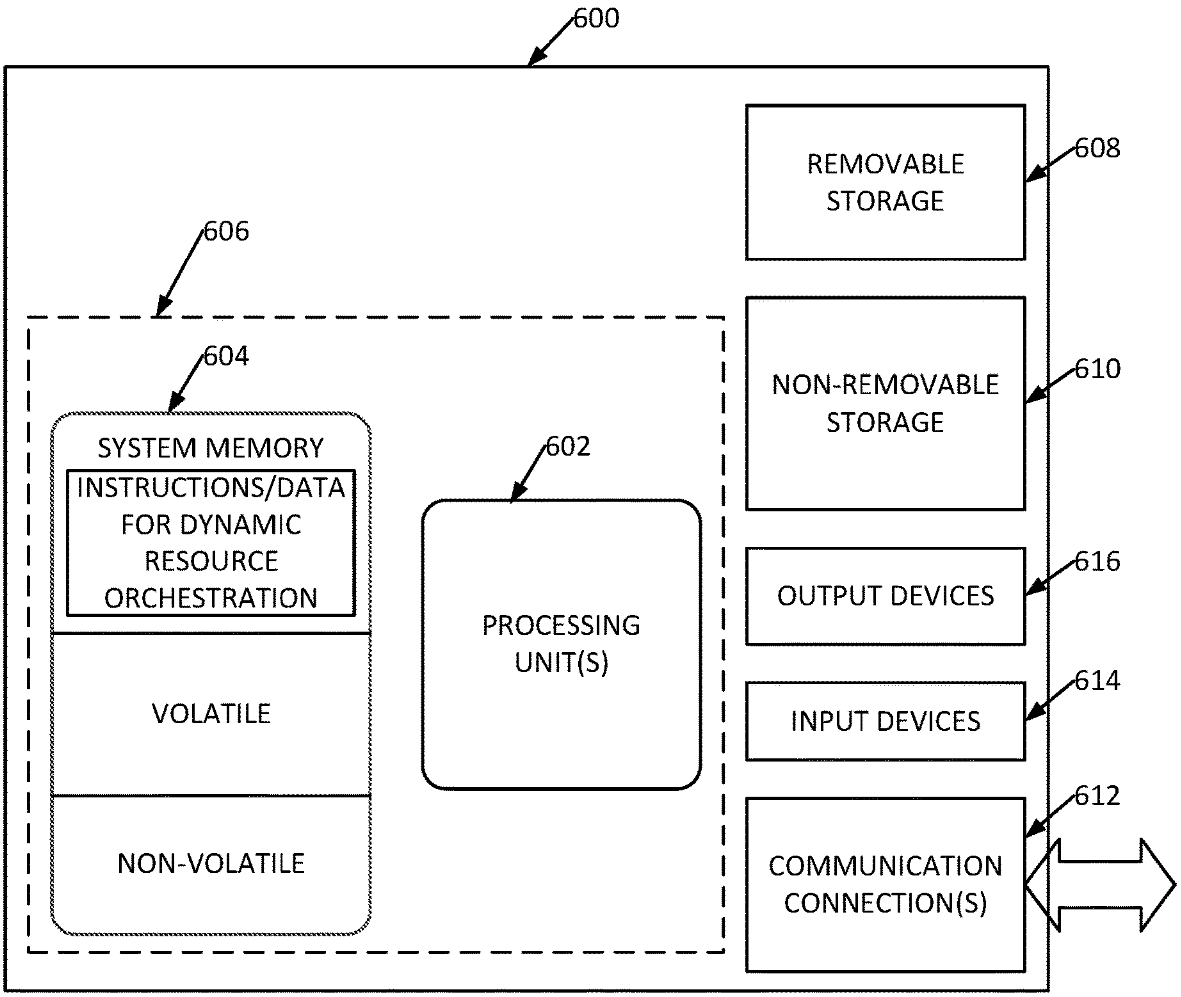
FIG. 6 illustrates an example of a suitable operating environment in which one or more aspects of the present application may be implemented.

FIG. 6 illustrates an example of a suitable operating environment 600 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most simplified configuration, operating environment 600 typically may include at least one processing unit 602 and memory 604. Depending on the exact configuration and type of computing device, memory 604 (storing, among other things, APIs, programs, etc. and/or other components or instructions to implement or perform the system and methods disclosed herein, etc.) may be volatile (such as RAM), non-volatile (such as ROM, flash memory, etc.), or some combination of the two. This most simplified configuration is illustrated in FIG. 6 by dashed line 606. Further, environment 600 may also include storage devices (removable, 608, and/or non-removable, 610) including, but not limited to, magnetic or optical disks or tape. Similarly, environment 600 may also have input device(s) 614 such as a keyboard, mouse, pen, voice input, etc. and/or output device(s) 616 such as a display, speakers, printer, etc. Also included in the environment may be one or more communication connections, 612, such as LAN, WAN, point to point, etc.

Operating environment 600 may include at least some form of computer readable media. The computer readable media may be any available media that can be accessed by processing unit 602 or other devices comprising the operating environment. For example, the computer readable media may include computer storage media and communication media. The computer storage media may include volatile and nonvolatile, removable, and non-removable media implemented in any method or technology for storage of information such as computer readable instructions, data structures, program modules or other data. The computer storage media may include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory medium, which can be used to store the desired information. The computer storage media may not include communication media.

The communication media may embody computer readable instructions, data structures, program modules, or other data in a modulated data signal such as a carrier wave or other transport mechanism and includes any information delivery media. The term "modulated data signal" may mean a signal that has one or more of its characteristics set or changed in such a manner as to encode information in the signal. For example, the communication media may include a wired media such as a wired network or direct-wired connection, and wireless media such as acoustic, RF, infrared and other wireless media. Combinations of the any of the above should also be included within the scope of computer readable media.

The operating environment 600 may be a single computer operating in a networked environment using logical connections to one or more remote computers. The remote computer may be a personal computer, a server, a router, a network PC, a peer device, or other common network node, and typically includes many or all of the elements described above as well as others not so mentioned. The logical connections may include any method supported by available communications media. Such networking environments are commonplace in offices, enterprise-wide computer networks, intranets, and the Internet.

The different aspects described herein may be employed using software, hardware, or a combination of software and hardware to implement and perform the systems and methods disclosed herein. Although specific devices have been recited throughout the disclosure as performing specific functions, one skilled in the art will appreciate that these devices are provided for illustrative purposes, and other devices may be employed to perform the functionality disclosed herein without departing from the scope of the disclosure.

As stated above, a number of program modules and data files may be stored in the system memory 604. While executing on the processing unit 602, program modules (e.g., applications, Input/Output (I/O) management, and other utilities) may perform processes including, but not limited to, one or more of the stages of the operational methods described herein such as the methods illustrated in FIG. 2A, 2B, 3, or 4, for example.

Furthermore, examples of the invention may be practiced in an electrical circuit comprising discrete electronic elements, packaged or integrated electronic chips containing logic gates, a circuit utilizing a microprocessor, or on a single chip containing electronic elements or microprocessors. For example, examples of the invention may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality described herein may be operated via application-specific logic integrated with other components of the operating environment 600 on the single integrated circuit (chip). Examples of the present disclosure may also be practiced using other technologies capable of performing logical operations such as, for example, AND, OR, and NOT, including but not limited to mechanical, optical, fluidic, and quantum technologies. In addition, examples of the invention may be practiced within a general purpose computer or in any other circuits or systems.

As will be understood from the foregoing disclosure, one aspect of the technology relates to a system for dynamic resource management comprising: at least one processor; and memory storing instructions that, when executed by the at least one processor, causes the system to perform a set of operations. The set of operations comprises: obtaining and storing a set of resource profiles in a resource repository; obtaining and storing a resource group having a first selection of primary resources and a first selection of secondary resources assigned thereto; identifying a resource-consuming event and a set of resource-consuming tasks associated with the resource-consuming event; assigning the resource-consuming event to the resource group; and assigning each resource-consuming task to a primary resource or a secondary resource of the resource group. In an example, assigning each resource-consuming task to a primary resource or a secondary resource of the resource group is based at least in part upon availability, performance, or experience of each resource. In another example, the set of operations further comprises: obtaining a task request associated with a resource of the resource group; wherein assigning each resource-consuming task to a primary resource or a secondary resource of the resource group is based at least in part upon the task request. In a further example, the set of operations further comprises: obtaining one or more task criteria associated with the set of resource-consuming tasks; wherein assigning each resource-consuming task to a primary resource or a secondary resource of the resource group is based at least in part upon the one or more task criteria. In still another example, the set of operations further comprises: updating the resource group to replace the first group of resource profiles with a second group of resource profiles, the second group of resource profiles including a second selection of primary resources and a second selection of secondary resources. In another example, the first selection of primary resources is different from the second selection of primary resources; and/or the first selection of secondary resources is different from the second selection of secondary resources. In another example, the set of operations further comprises: updating the resource repository to update one or more of the set of resource profiles. In yet another example, assigning the resource-consuming event to the resource group comprises: identifying a designated primary resource from an event record; and determining that the designated primary resource is one of the resources of the resource group. In a further example, the set of operations further comprises: providing a task dashboard via an interactive display, the task dashboard including at least assignment information of each resource-consuming task. In still another example, the set of resource profiles is stored distributedly across a set of resource nodes on a shared network.

In another aspect, the technology relates to a method for dynamic resource management. The method comprises: obtaining and storing a set of resource profiles in a resource repository; obtaining and storing a resource group having a first selection of primary resources and a first selection of secondary resources assigned thereto; identifying a resource-consuming event and a set of resource-consuming tasks associated with the resource-consuming event; assigning the resource-consuming event to the resource group; and assigning each resource-consuming task to a primary resource or a secondary resource of the resource group. In an example, assigning each resource-consuming task to a primary resource or a secondary resource of the resource group is based at least in part upon availability, performance, or experience of each resource. In another example, the method further comprises: obtaining a task requests submitted by a resource of the resource group; wherein assigning each resource-consuming task to a primary resource or a secondary resource of the resource group is based at least in part upon the task request. In yet another example, the method further comprises: obtaining one or more task criteria associated with the set of resource-consuming tasks; wherein assigning each resource-consuming task to a primary resource or a secondary resource of the resource group is based at least in part upon the one or more task criteria. In a further example, the method further comprises: updating the resource group to replace the first group of resource profiles with a second group of resource profiles, the second group of resource profiles including a second selection of primary resources and a second selection of secondary resources. In still another example, the first selection of primary resources is different from the second selection of primary resources; and/or the first selection of secondary resources is different from the second selection of secondary resources. In another example, the method further comprises: updating the resource repository to update one or more of the set of resource profiles. In yet another example, assigning the resource-consuming event to the resource group comprises: identifying a designated primary resource from an event record; determining that the designated primary resource is one of the resources of the resource group. In a further example, the method further comprises: providing a task dashboard via an interactive display, the task dashboard including at least assignment information of each resource-consuming task.

In a further aspect, the technology relates to a method for dynamic resource management. The method comprises: obtaining and storing a resource group having a first selection of primary resources and a first selection of secondary resources assigned thereto; identifying a resource-consuming event and a set of resource-consuming tasks associated with the resource-consuming event; assigning each resource-consuming task to a primary resource or a secondary resource of the resource group; and updating the resource group to replace the first selection of primary resources and a first selection of secondary resources with a second selection of primary resources and a second selection of secondary resources; wherein: the first selection of primary resources is different from the second selection of primary resources; and/or the first selection of secondary resources is different from the second selection of secondary resources.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system for dynamic resource management comprising:

at least one processor; and memory storing instructions that, when executed by the at least one processor, causes the system to perform a set of operations, the set of operations comprising:

receiving, from a computing device of a user, a submission of a task request, the submission comprising event information;

processing, by the system, the received task request to determine a resource-consuming event associated with the task request;

processing the resource-consuming event to generate a set of resource-consuming tasks based on an association between a type of the resource-consuming event and the set of resource-consuming tasks, wherein each task of the resource-consuming tasks has an associated set of criteria; and assigning the resource-consuming event to a resource group of the system, the assigning comprising:

determining a designated primary resource from an event record associated with the user, the determining based at least in part on receiving an availability indication from a first resource computing device of the designated primary resource;

selecting the resource group from a resource repository based on the designated primary resource having membership of the resource group, wherein the resource group comprises a first selection of primary resources and a second selection of secondary resources;

generating, to the first resource computing device of the designated primary resource, a request indicating a first task from the generated set of resource-consuming tasks, thereby initiating task performance of the first task by the designated primary resource via the first resource computing device and overriding a default task assignment for the first task; and generating, to a second resource computing device of a secondary resource of the selected resource group, a request indicating a second task from the generated set of resource-consuming tasks, thereby initiating task performance of the second task by the second resource computing device according to a default task assignment for the second task.

2. The system of claim 1, wherein assigning each resource-consuming task to a primary resource or a secondary resource of the resource group is based at least in part upon availability, performance, or experience of each resource.

3. The system of claim 1, wherein the task request is associated with a resource of the resource group and wherein assigning each resource-consuming task to a primary resource or a secondary resource of the resource group is based at least in part upon the event information.

4. The system of claim 1, wherein the set of operations further comprises:

obtaining one or more task criteria associated with the set of resource-consuming tasks;

wherein assigning each resource-consuming task to a primary resource or a secondary resource of the resource group is based at least in part upon the one or more task criteria.

5. The system of claim 1, wherein the set of operations further comprises:

updating the resource group to replace first group of resource profiles in the resource repository with a second group of resource profiles, the second group of resource profiles including a second selection of primary resources and a second selection of secondary resources.

6. The system of claim 5, wherein:

a first selection of primary resources is different from the second selection of primary resources; or a first selection of secondary resources is different from the second selection of secondary resources.

7. The system of claim 1, wherein the set of operations further comprises:

updating the resource repository to update one or more of the set of resource profiles.

8. The system of claim 1, wherein the set of operations further comprises:

providing a task dashboard via an interactive display, the task dashboard including at least assignment information of each resource-consuming task.

9. The system of claim 1, wherein the set of resource profiles is stored distributedly across a set of resource nodes on a shared network.

10. The system of claim 1, wherein assignment of the first task to the designated primary resource is prioritized over the second task as a result of comparing task criteria associated with the first task to task criteria associated with the second task.

11. A method for dynamic resource management comprising:

obtaining and storing a set of resource profiles in a resource repository;

obtaining and storing a resource group having a first selection of primary resources and a first selection of secondary resources assigned thereto;

processing user activity from a computing device of a user of the platform to identify a resource-consuming event associated with the user;

processing the identified resource-consuming event to generate a set of resource-consuming tasks, wherein the set of resource-consuming tasks is associated with a type of the resource-consuming event;

assigning the resource-consuming event to the resource group, the assigning comprising:

identifying a designated primary resource from an event record, the identifying based at least in part on receiving an availability indication from a first resource computing device of the designated primary resource; and determining that the designated primary resource is one of the resources of the resource group; and assigning each resource-consuming task to a primary resource or a secondary resource of the resource group, the assigning comprising providing a task assignment indication to a respective computing device associated with the resource group to initiate performance of the resource-consuming task in response to receipt of the task assignment indication by the respective computing device, wherein a first task of the set of resource-consuming tasks is assigned to the first resource computing device, thereby overriding a default task assignment for the first task.

12. The method of claim 11, wherein assigning each resource-consuming task to a primary resource or a secondary resource of the resource group is based at least in part upon availability, performance, or experience of each resource.

13. The method of claim 11, further comprises:

obtaining one or more task criteria associated with the set of resource-consuming tasks;

wherein assigning each resource-consuming task to a primary resource or a secondary resource of the resource group is based at least in part upon the one or more task criteria.

14. The method of claim 11, further comprises:

updating the resource group to replace the first group of resource profiles with a second group of resource profiles, the second group of resource profiles including a second selection of primary resources and a second selection of secondary resources.

15. The method of claim 14, wherein:

the first selection of primary resources is different from the second selection of primary resources; or the first selection of secondary resources is different from the second selection of secondary resources.

16. The method of claim 11, further comprises:

updating the resource repository to update one or more of the set of resource profiles.

17. The method of claim 11, further comprises:

providing a task dashboard via an interactive display, the task dashboard including at least assignment information of each resource-consuming task.

18. The method of claim 11, the user activity with the platform comprises at least one of:

a user interaction with a webpage of the platform; or a user interaction with a software application of the platform.

19. A method for dynamic resource management comprising:

obtaining and storing a resource group having a first selection of primary resources and a first selection of secondary resources assigned thereto;

processing a user interaction received from a computing device of a user to identify a resource-consuming event resulting from the user interaction;

processing the identified resource-consuming event to generate, corresponding to a type of the identified resource-consuming event, a set of resource-consuming tasks;

assigning each resource-consuming task to a primary resource or a secondary resource of the resource group, the assigning comprising providing a task assignment indication to a respective computing device associated with the resource group to initiate performance of the resource-consuming task in response to receipt of the task assignment indication by the respective computing device, wherein a first task is assigned to a computing device of the primary resource based on a previously received availability indication from the computing device, thereby overriding a default assignment for the first task; and instead of the secondary resource based on comparing task criteria for the first task to task criteria for the second task; and updating the resource group to replace the first selection of primary resources and a first selection of secondary resources with a second selection of primary resources and a second selection of secondary resources;

wherein:

the first selection of primary resources is different from the second selection of primary resources; or the first selection of secondary resources is different from the second selection of secondary resources.

* * * * *